United States Patent [19]

Buss et al.

[11] 3,998,995

[45] Dec. 21, 1976

[54] POLYMERIZATION METHOD AND APPARATUS

[75] Inventors: Russel A. Buss, Bartlesville, Okla.; Ralph Cox, Houston, Tex.; Jim B. Palmer, Bartlesville, Okla.

[73] Assignee: Phillips Petroleum Company, Bartlesville, Okla.

[22] Filed: Dec. 2, 1974

[21] Appl. No.: 528,730

[52] U.S. Cl. .............................. 526/59; 23/253 A; 260/95 A; 260/95 C

[51] Int. Cl.² ...................... C08F 2/06; C08F 2/00; C08F 10/02

[58] Field of Search ................ 260/94.9 P, 88.2 B, 260/88.2 F, 95 A, 95 C; 23/253 A; 526/59

[56] References Cited
UNITED STATES PATENTS

| | | | |
|---|---|---|---|
| 3,078,265 | 2/1963 | Berger et al. | 260/94.9 P |
| 3,108,094 | 10/1963 | Morgan | 260/94.9 P |
| 3,257,363 | 6/1966 | Miller et al. | 260/94.9 P |
| 3,356,667 | 12/1967 | Smith et al. | 260/94.9 P |
| 3,492,283 | 1/1970 | Miller | 260/94.9 P |
| 3,594,559 | 7/1971 | Pemberton | 260/94.9 P |
| 3,817,962 | 6/1974 | Smith et al. | 260/94.9 P |

*Primary Examiner*—Alan Holler

[57] ABSTRACT

Polymerization of a monomer, either alone or present in major proportion with one or more comonomers present in minor proportion, is accomplished by controlling the major monomer feed rate in response to a signal representative of the production rate of the polymerization process, unless the major monomer concentration within the reaction zone exceeds a preselected high limit causing the major monomer feed rate to be controlled in response to the concentration of the major monomer within the reaction zone. The flow of recycle diluent to the reaction zone is controlled in response to the concentration of major monomer within the reaction zone unless the solids concentration within the reaction zone exceeds a preselected high limit, in which case the flow of recycle diluent to the reaction zone is controlled in response to the concentration of solids within the reaction zone. Under ordinary operating conditions, when the preselected maximums have not been exceeded, the flow of major monomer to the reaction zone is controlled in response to the polymer production rate and the flow of recycle diluent to the reaction zone is controlled in response to the concentration of major monomer within the reaction zone.

48 Claims, 8 Drawing Figures

POLYMERIZATION METHOD AND APPARATUS

This invention relates to a polymerization method and apparatus. In another aspect it relates to a method and apparatus for controlling a polymerization reaction. In yet another aspect the invention relates to a method and apparatus for controlling the rate of production of a polymer.

Complex chemical reactions, such as polymerization reactions, which are carried out on a commercial scale, require a substantial investment in heavy production equipment which must be controlled during its operation in accordance with a control scheme that will both insure the production of the desired product and simultaneously maintain operation of the various production equipment within acceptable limits consistent with safe and efficient equipment operation. A search is therefore continually under way to develop polymerization processes and control schemes which, while utilizing existing production equipment, will provide increased production within the safe operating range of all involved production equipment.

It is therefore an object of this invention to provide a polymerization method and apparatus. Another object of the invention is to provide a method and apparatus for controlling a polymerization reaction. Still another object of the invention is to provide a method and apparatus for controlling the rate of production of a polymer. Yet another object of the invention is to provide a method and apparatus for operating a polymerization reaction at maximum production without plugging the reactor.

Although the invention can be carried out in conjunction with a variety of apparatus configurations and can be used in the production of many different polymers including both homopolymers and copolymers, the apparatus ordinarily used comprises a reactor having provision for accepting input streams comprising a major monomer stream, a modifier stream, a fresh diluent stream, a recycle diluent stream, and, in some applications, one or more minor comonomer streams used in conjunction with a particle form or slurry polymerization reaction wherein solid polymer is formed in the presence of the reactor liquid contents, the polymer generally being of higher relative density than the reactor liquid contents. In addition, the reactor is equipped with means for removing or supplying heat to the reaction and means for removing the reaction products from he reactor. The control system used in conjunction with the reactor and its associated equipment can be of any suitable type including electrical, mechanical, pneumatic, hydraulic, or other type of control system of either digital or analog configuration, or a combination of two or more such control types.

In accordance with the invention, the polymer formation rate is determined by making a heat balance around the reactor. The control system determines the major monomer feed rate required to yield a desired polymer production rate. The major monomer feed rate is set by and adjusted in response to this determination unless the major monomer concentration in the reactor increases beyond a predetermined high limit.

The major monomer concentration in the reactor is determined by the control system using material balance determinations which are updated by chromatographic analysis of an off-gas recovered from flashing the reactor effluent or by other suitable means, such as direct reactor liquid content sampling. When the major monomer concentration limit in the off-gas is exceeded, the control system automatically switches to the manipulation of major monomer feed for control of major monomer concentration within the reactor, rather than control of production rate. When the major monomer concentration is below the high limit and the determined polymer formation rate has returned to the normal level, the control system automatically switches back to its normal polymer production rate control mode. The effects of temperature and pressure on major monomer volume are compensated for so that major monomer feed control is essentially a mass rate rather than a volume rate.

The major monomer concentration in the reactor is normally controlled by manipulating the recycle diluent feed rate to adjust the residence time of material within the reactor. when the major monomer concentration increases, the control system will decrease the recycle diluent flow. This has the effect of increasing the reactor residence time thereby increasing the concentration of catalyst within the reactor and increasing the reaction rate to react the excess major monomer. Likewise, when the major monomer concentration decreases, the control system will increase the recycle diluent flow to flush out some catalyst and slow the reaction rate to build up the concentrations of major monomer. Residence time of solids and catalyst in the reactor is reflected by solids concentration.

Whenever the solids concentration exceeds a predetermined high limit, the control system automatically switches to a manipulation of recycle diluent flow for control of solids concentration. The recycle diluent flow is increased by the solids controller in order to facilitate removal of polymer by decreasing the residence time. Solids concentration control continues until the solids concentration is below the high limit and the major monomer concentration is near its desired level. Control is then automatically switched back to normal major monomer concentration control.

The invention therefore provides a polymerization reaction and an associated control system which permit production at a maximum rate but prevent plugging of the reactor. Additional objects and advantages of the invention will be apparent from the remainder of the specification and claims and particularly from the detailed description of the preferred embodiment for a copolymerization reaction illustrated by the drawings in which:

Figure 7:
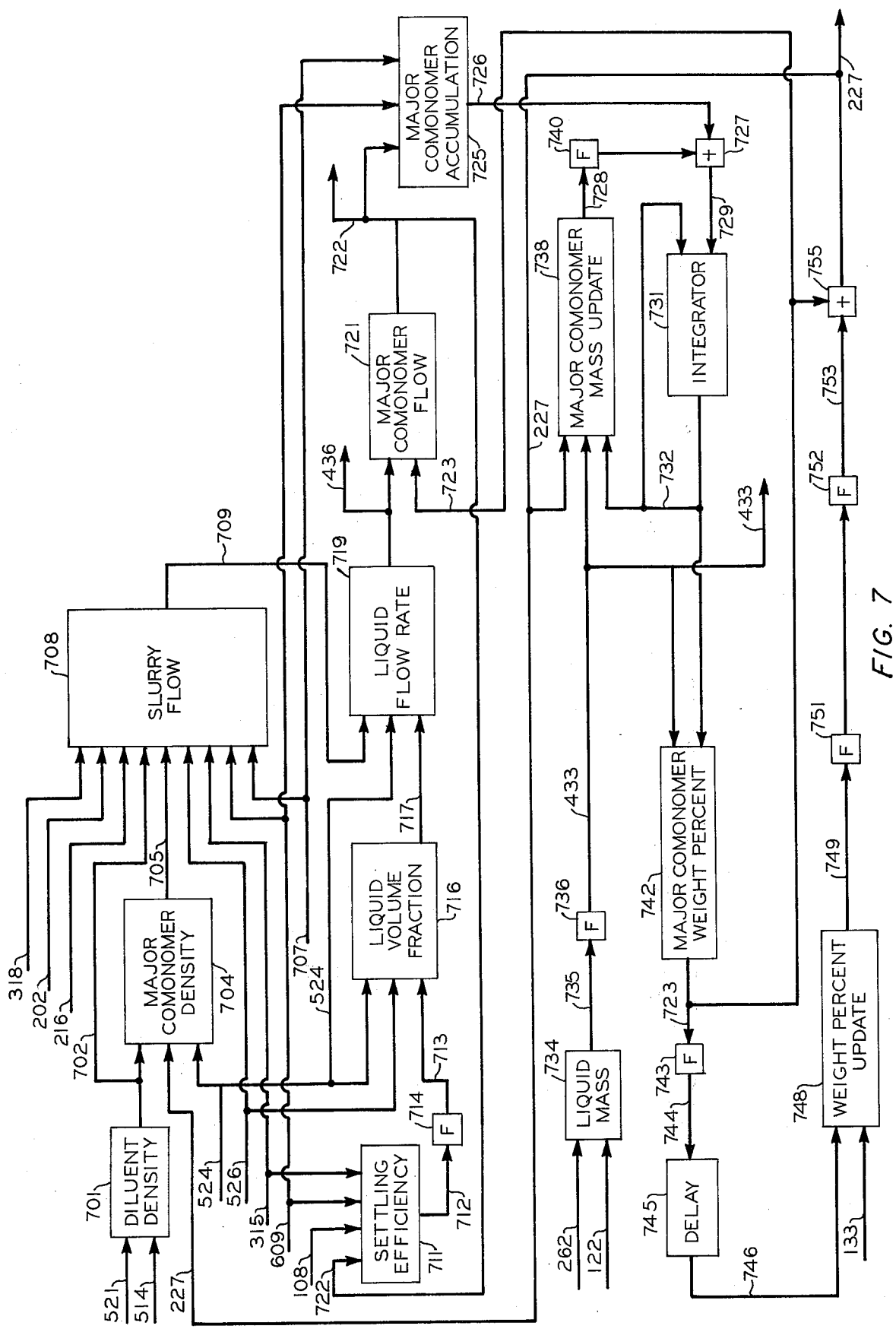
Figure 8:
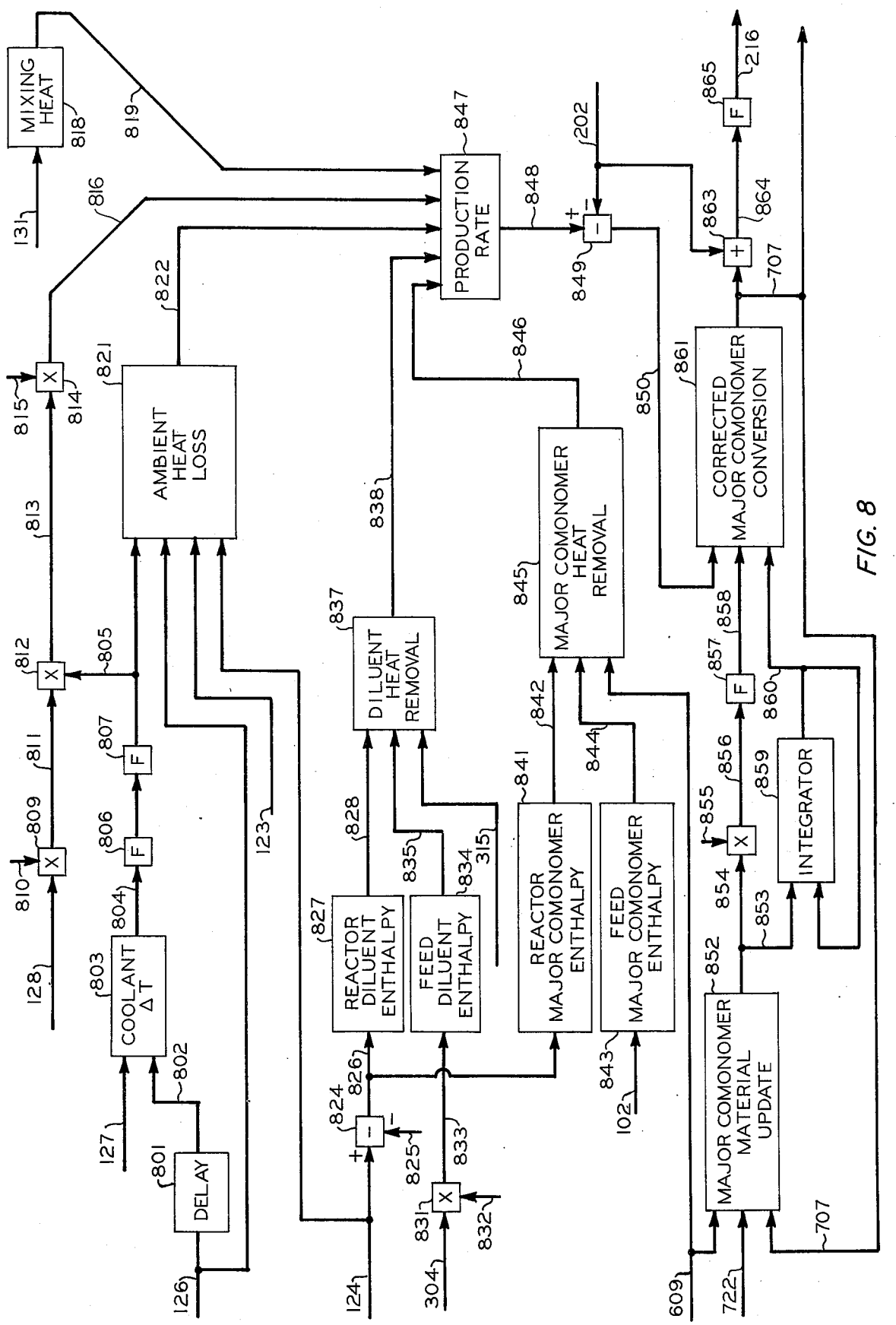

FIG. 7 is a schematic block diagram and flow chart of a portion of the control system which generates a signal representative of the concentration of major comonomer in the liquid phase within the reaction zone; and FIG. 8 is a schematic block diagram and flow chart of a portion of the control system which generates a signal representative of the production rate of polymer within the reaction zone.

In a preferred embodiment of the invention illustrated and hereinafter described, a polyolefin product is formed by the polymerization of ethylene with a minor amount of a comonomer such as hexene-1. The polymerization reaction takes place in the presence of a suitable diluent and a modifier, for example, hydrogen. Isobutane and normal butane are exemplary of suitable diluents.

Figure 1:
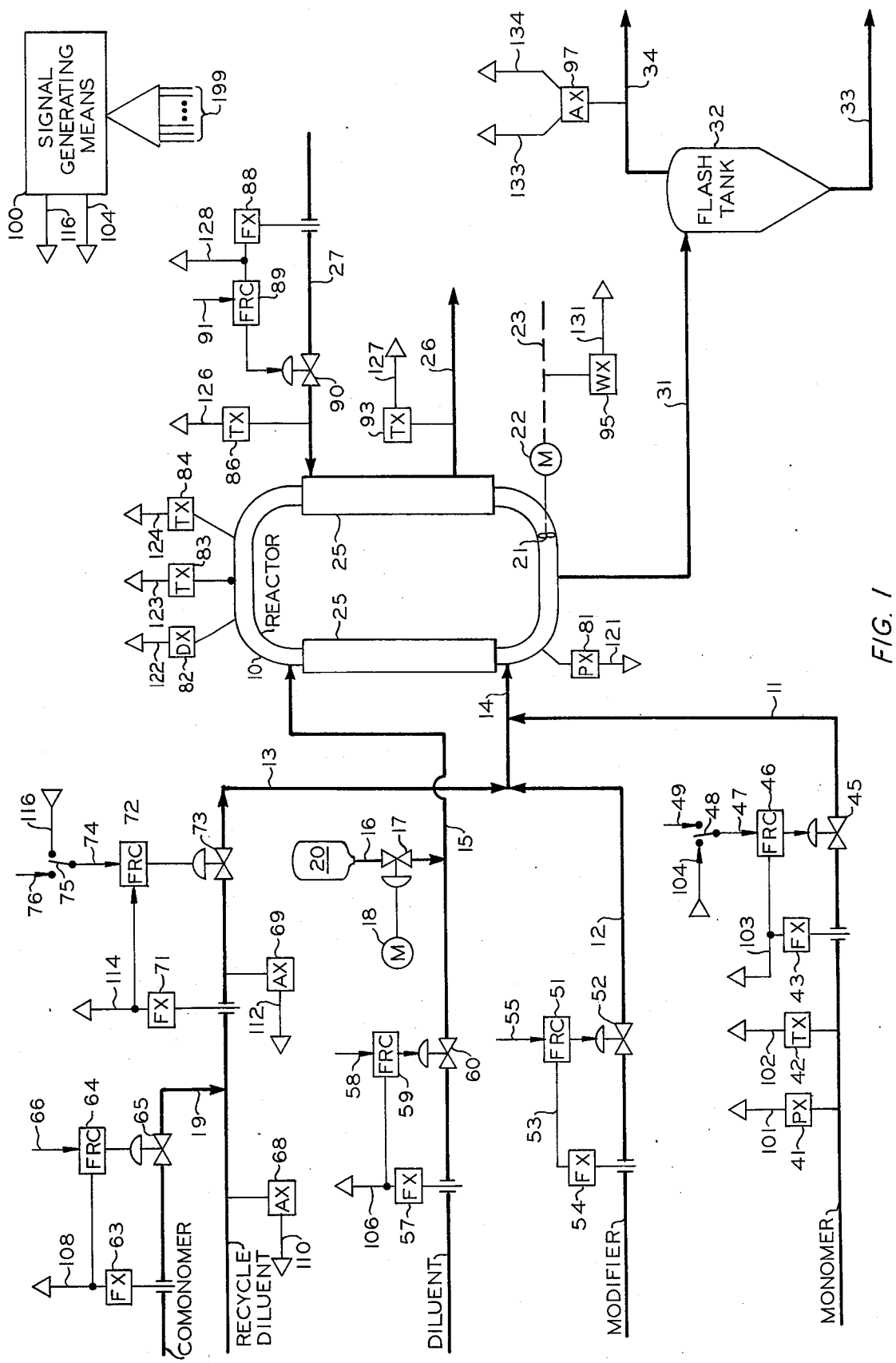
FIG. 1 is a schematic representation of a polymerization reactor and its associated equipment.

Referring now to FIG. 1, there is shown a reactor 10. A major comonomer such as ethylene is carried to the reactor 10 through a conduit 11. The modifier stream is carried to the reactor 10 through an conduit 12. A recycle diluent stream is carried to the reactor 10 by a conduit 13. The minor comonomer, if any, can be added to the recycle diluent stream in conduit 13 via conduit 19. Conduits 11, 12, and 13 join a common conduit 14 which communicates with the reactor 10. A fresh diluent stream is introduced into the reactor 10 through a conduit 16 which communicates directly with the interior of the reactor 10. A suitable catalyst from a catalyst feed tank 20 is introduced into conduit 15 through a conduit 16 having a control element 17 therein. The control element 17 can be a rotatable valve which introduces a catalyst slurry from the tank 20 into the system in increments, the rate of catalyst introduction being controlled by the speed of rotation of a motor 18 or by other suitable means.

The reactor 10 is provided with an impeller 21 which is rotated by a motor 22 to which electrical power is provided through a power line 23. The reactor 19 is also provided with jackets 25 through which a heat exchangers fluid is circulated. The polymerization reaction is exothermic so that it is ordinarily necessary to pass a coolant through the jackets 25 to remove heat from the reactor. The coolant flows in a closed path which includes a withdrawal conduit 26, a pump (not shown), heating and cooling means (not shown) to regulate the temperature of the coolant recirculated into the jackets 25 through conduit 27, and means (not shown) for providing fluid communication between jackets 25.

The produced polymer is removed from the reactor through conduit 31 and carried to a flash tank 32. The solid polymer product is removed from the flash tank through a product conduit 33. The diluent, hydrogen and unreacted monomer removed from the reactor conduit 31 are flashed and removed from the flash tank 32 through an overhead conduit 34. The material removed from the flash tank 32 through the overhead conduit 34 will ordinarily be recirculated to the reactor 10 via the recycle diluent stream 13.

The pressure transducer 41, a temperature transducer 42 and a flow rate transducer 43, each being associated with conduit 11, respectively generate a major comonomer pressure signal 101 representative of the pressure of material within the conduit 11, a major comonomer temperature signal 102 representative of the temperature of material within the conduit 11, and a major comonomer flow rate signal 103 representative of the flow rate of material through conduit 11. A valve means 45 is controlled by a flow controller means 46 to provide a flow rate of material through the conduit 11, as measured by the major comonomer flow rate signal 103, equal to the desired flow rate represented by a set point signal 47. A switch means 48 permits selection of the set point signal 47 from a fixed controller set point signal 49 or a variable major comonomer set point signal 104 generated by a signal generating means 100.

The flow of modifier to the reactor 10 through the conduit 12 can be controlled in any conventional manner such as, for example, by utilizing a flow controller 51 to adjust a valve 52 in the conduit 12 in response to a signal 53, representative of the flow rate of material through the conduit 12 as measured by a flow transducer 54, and a set point signal 55 corresponding to the desired flow rate of material through the conduit 12.

A flow transducer 57 associated with conduit 15 produces a fresh diluent flow rate signal 196 representative of the flow rate of material through the conduit 15. In response to a comparison of the diluent flow rate signal 106 and a set point signal 58, a flow controller 59 manipulates a valve means 60 to provide a flow rate of material through the conduit 15, as measured by the flow transducer 57, corresponding to the desired flow rate represented by the set point signal 58.

A flow transducer 63 produces a minor comonomer flow rate signal 108 representative of the flow rate of material through the conduit 19. The flow rate of material through conduit 19 is controlled by flow controller 64 which manipulates a valve means 65 to provide a flow of material through the conduit 19, as indicated by the minor comonomer flow rate signal 108, equal to the desired flow rate specified by a set point signal 66. The temperature of the recycle diluent stream entering conduit 13 is measured by a temperature transducer 68 which produces a recycle diluent temperature signal 110 representative thereof. An analyzer means 69 is adapted to sample the contents of the conduit 13 downstream of the confluence of conduit 19 therewith and to deliver a minor comonomer concentration signal 112 representative of the concentration of the minor comonomer within the diluent stream in conduit 13. A flow transducer 71 produces a recycle diluent flow rate signal 114 representative of the flow rate of combined recycle diluent and minor comonomer through conduit 13. A flow controller 72 regulates the flow rate of the combined recycle diluent and minor comonomer through conduit 13 by adjusting a valve means 73 to provide a flow, as measured by the flow transducer 71, equal to that represented by a desired flow rate set point 74. A switch means 75 permits the set point 74 to be selected from a fixed set point 76 and a variable set point signal 116 generated by the signal generating means 100.

A pressure transducer 81, associated with the reactor 10, produces a reactor pressure signal 121 representative of the pressure within the reactor 10. Although the pressure transducer 81 illustrated in FIG. 1 is shown commmunicating directly with the reactor 10, communication with the conduit 14, or with any other suitable location having a pressure equal to or directly related to the pressure within the reactor 10, can be employed. A density transducer 82 associated with the reactor 10 produces a slurry density signal 122 representative of the density of the slurry made up of the contents of the reactor 10. A temperature transducer 83 produces an external reactor temperature signal 123 representative of the temperature at an external surface of the reactor 10. A temperature transducer 84 produces an internal reactor temperature signal 124 representative of the temperature of the reactor contents. A temperature transducer 86 produces a coolant inlet temperature signal 126 representative of the temperature of the coolant entering the jackets 25 through conduit 27. The flow rate of coolant through the conduit 27 is measured by a flow transducer 88 which produces a coolant flow rate signal 128 representative thereof. The flow of coolant through the conduit 27 is regulated by a flow controller 89 which manipulates a valve means 90 to provide a flow rate, as measured by the flow transducer 88, equal to the flow rate represented by a set point signal 91. A temperature transducer 93 produces a coolant withdrawal temperature signal 127 representative of the temperature of coolant withdrawn from the jackets 25 through the withdrawal conduit 26.

A circulating pump power signal 131 is generated by a power transducer 95 associated with the power line 23 supplying energy to the motor 22. The power transducer 95 can typically comprise a wattmeter or kilowattmeter capable or providing a suitable circulating pump power signal 131.

An analyzer means 97 produces a major comonomer off-gas concentration signal 133 representative of the concentration of the major comonomer in the off-gas withdrawn from the flash tank 32 through the overhead conduit 34, and a minor comonomer off-gas concentration signal 134 representative of the concentration of the minor comonomer in the flash tank overhead conduit 34.

Although the various transducing elements herein described can be any suitable elements adapted to produce the designated signals, the apparatus and method of the invention are particularly useful in their ability to utilize conventional equipment to the greatest extent without the need for special measuring or transducing equipment. Typical measuring and controlling equipment which can be utilized in conjunction with the method and apparatus of the invention are as follows:

Pressure transducer — Foxboro-Baldwin fluid pressure cell transmitter, The Foxboro Company, Foxboro, Mass.
Temperature transducer — Foxboro Dynatherm resistance bulb, The Foxboro Company, Foxboro, Mass.
Flow rate transducer — Type 613 electronic differential pressure cell transmitter, The Foxboro Company, Foxboro, Mass.
Flow controller — Model T/69A electro-pneumatic converter, The Foxboro Company, Foxboro, Mass.
Analyzer — Optichrom 2C chromatographic analyzer system, Applied Automation Inc., Bartlesville, OK.
Density transducer — Model DH-2 density measuring system, Industrial Nucleonics Corp., Columbus, Ohio.
Power transducer — Model 4986 three phase watt transducer, Esterline-Angus Instrument Co., Inc., Indianapolis, IN.

All signals illustrated in FIG. 1 with reference numerals from 101 to 199 inclusive, and designated by a triangle, are utilized as communication links between the signal generating means 100 and the other apparatus of the invention. The orientation of the triangle associated with each signal indicates the direction of communication with the signal generating means 100. Input signals 199 to the signal generating means 100 comprise all of the thus illustrated signals, except signals 104 and 116. FIGS. 2–8 illustrate the manner in which the input signals 199 are utilized in generating signals 116 and 104.

Figure 2:
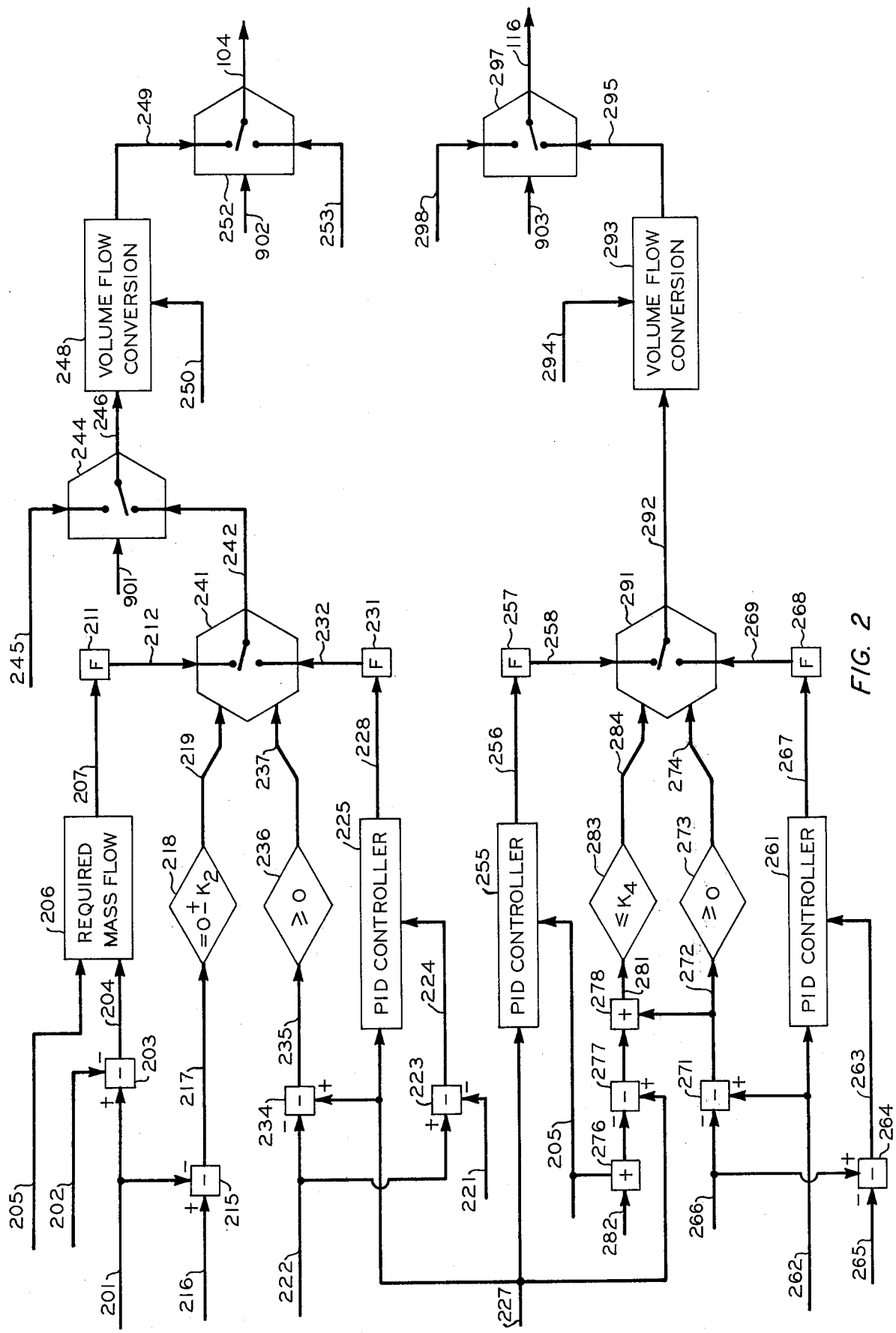
FIG. 2 is a schematic block diagram and flow chart of the control system showing the generation of the major comonomer feed set point and recycle diluent feed set point.
Figure 4:
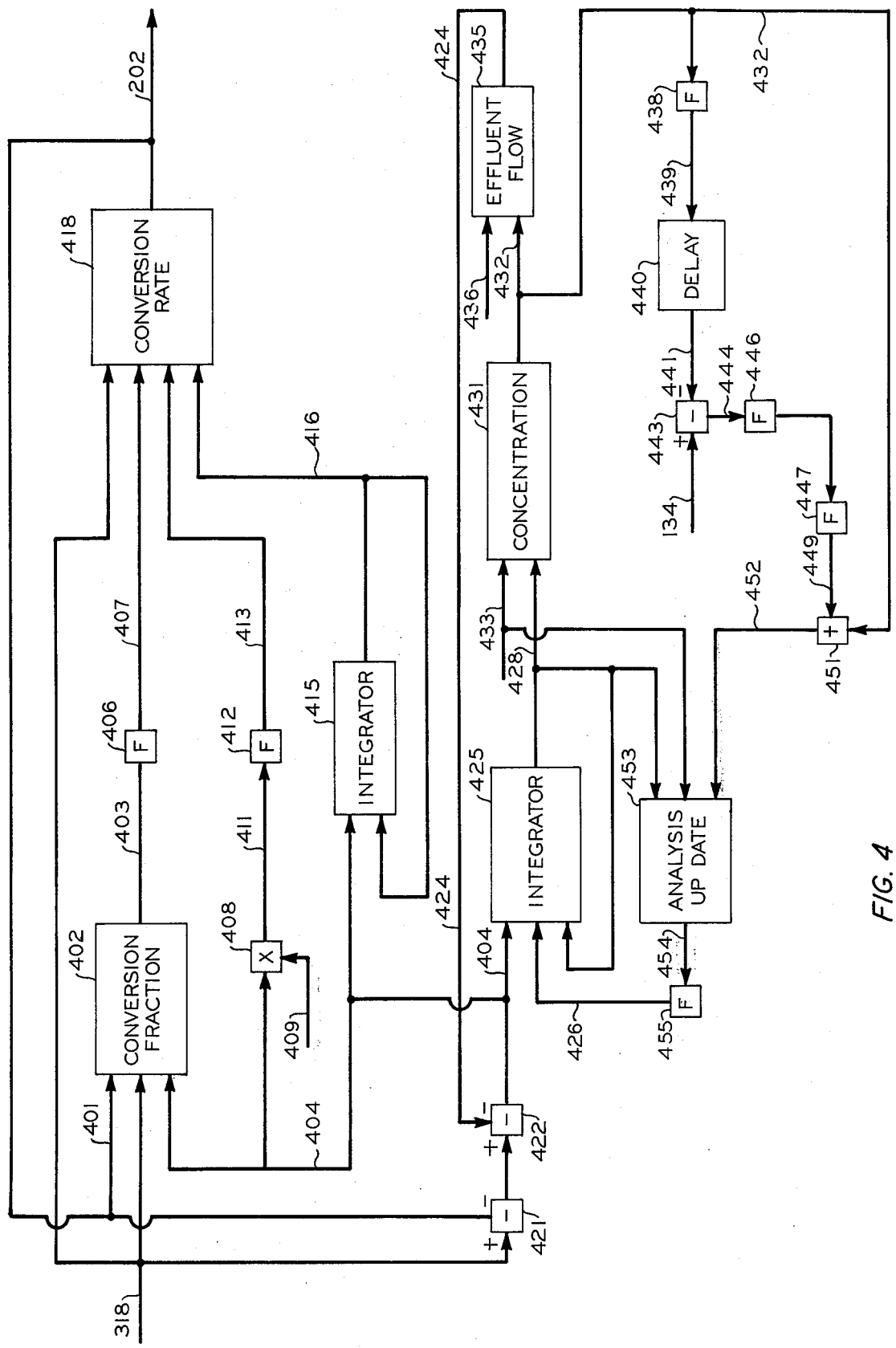
FIG. 4 is a schematic block diagram and flow chart of a portion of the control system which generates a signal representative of the conversion rate of minor comonomer to polymer.

FIG. 2 illustrates schematically the manner in which the major comonomer set point signal 104 and the diluent flow rate set point signal 116 are generated. A preselected production rate set point signal 201 is representative of the desired polymer production rate for the reactor 10. A minor comonomer conversion rate signal 202 is subtracted from signal 201 by a subtracting means 203 to produce a major comonomer production rate set point signal 204 representative of the desired conversion rate of major comonomer to polymer within the reactor 10. The generation of the minor comonomer conversion rate signal 202 is illustrated by FIG. 4. In response to signal 204 and a major comonomer concentration set point signal 205, representative of the desired concentration of major comonomer within the reactor 10, a required mass flow signal generating means 206 generates a signal 207 representative of the required major comonomer feed mass flow necessary to yield the production specified by the production rate set point signal 201 under the reaction conditions indicated by the minor comonomer conversion rate signal 202 and the major comonomer concentration set point signal 205. A filtering means 211 accepts signal 207 and produces in response thereto a filtered major comonomer mass flow requirement signal 212. In general, the required mass flow signal generating means 206 will fulfill the condition:

$$FU_{46} = FS_{15} + k_1(FS_{15})(AS_1) ,$$

where
$FU_{46}$ = required major comonomer feed mass flow = signal 207,
$FS_{15}$ = major comonomer production rate set point = signal 204,
$AS_1$ = major comonomer concentration set point = signal 205, and
$K_1$ = a constant.

A substracting means 215 subtracts the production rate set point signal 201 from a filtered production rate signal 216 to produce a signal 217 representative of the difference between the desired production rate as represented by signal 201 and the actual production rate as represented by signal 216. Although signal 216 can be generated in any manner which will produce a satisfactory signal representative of and responsive to the rate of production within the reactor 10, FIG. 8 illustrates a preferred technique for generating the filtered production rate signal 216. A comparison means 218 compares signal 217 with zero, and, if signal 217 differs from zero by no more than a constant $K_2$, it generates a switching signal 219. Generation of a switching signal 219 by the comparison means 218 is therefor indicative of a production rate, as indicated by signal 216, which differs from the production rate specified by set point signal 210 by no more than an amount represented by the value of $K_2$.

A subtracting means 223 subtracts a bias signal 221 from a signal 222 representative of the major comonomer concentration high limit which can be safely tolerated within the reactor 10. The signal 224 resulting from the subtraction is utilized as a set point for a high limit major comonomer concentration proportional-integral-derivative controller 225. In response to a major comonomer concentration signal 227, representative of the weight percent of major comonomer within the liquid phase of the reactor 10, and set point signal 224, the proportional-integral-derivative controller means 225 produces an output signal 228 which is filtered by a filtering means 231 to produce a high limit major comonomer control signal 232.

a subtracting means 234 subtracts signal 222 from signal 227 to produce a signal 235 representative of the difference between the major comonomer concentration within the reactor and the major comonomer concentration high limit. A comparison means 236 produces a switching signal 237 whenever signal 235 is greater than or equal to zero, an indication that the concentration of major comonomer within the reactor 10 has equaled or exceeded the major comonomer concentration high limit represented by signal 222. A dead band constant or other similar means can be incorporated into the comparison means 236 to prevent discontinuation of the switching signal 237 unitl the signal 235 falls to a preselected value below zero. While the major comonomer concentration signal 227 can be generated by any suitable means, a preferred technique for obtaining signal 227 is illustrated by FIG. 7.

An automatically actuated signal selected switch means 241 is adapted to deliver one of signals 212 and 232 as an output signal 242 in response to the presence or absence of switching signals 219 and 237. The operation of switch means 241 is such that whenever switching signal 237 is actuated in response to the major comonomer concentration signal being equal to or in excess of the major comonomer concentration high limit signal 222, the switch means 241 will deliver as the output signal 242 thereof the high limit major comonomer control signal 232. In the absence of a condition causing generation of the switching signal 237 and under conditions causing the generation of a switching signal 219, signal 212 will be selected as the output signal 242. When neither switching signals 219 or 237 is actuated the signal selecting switch means 241 will remain in its previous condition.

A switch means 224 permits manual or automatic selection between the output signal 242 of the automatically actuated signal selecting switch means 241 and a major comonomer mass flow set point signal 245 to produce an output mass flow set point signal 246. Switch means 244 can be automatically actuated by, for example, an error signal 901 indicating a malfunction in the generation of signal 242, and, whenever the error signal 901 is present, will provide a signal 246 equal to signal 245.

Figure 6:
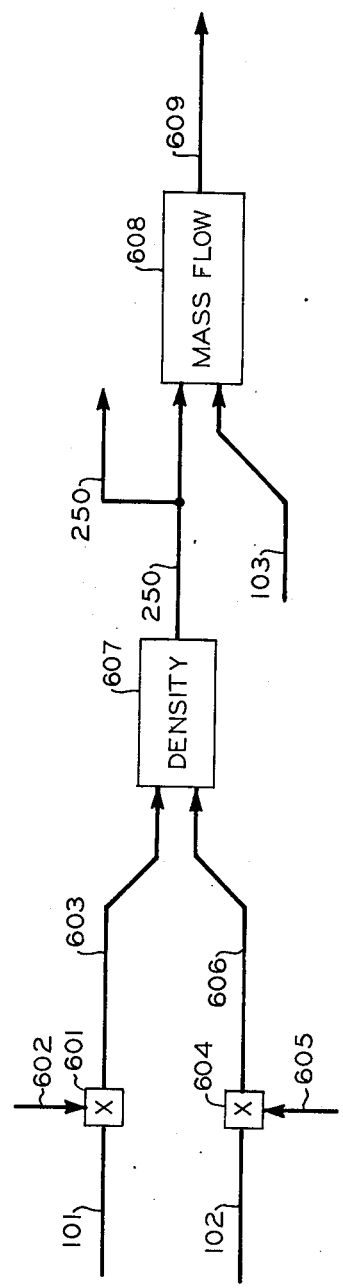
FIG. 6 is a schematic block diagram and flow chart of a portion of the control system which generates a signal representative of the density and of the corrected mass flow rate of major comonomer to the reaction zone.

A volume flow conversion means 248 produces a major comonomer volume flow set point signal 249 corresponding to the output mass flow set point signal 246 in response to signal 246 and a major comonomer density signal 250. Although the major comonomer density signal 250 can be obtained by any means productive of an acceptable signal, a preferred method of generating signal 250 is illustrated in FIG. 6. While the volume flow conversion means 248 can be any means suitable for converting a mass flow rate set point to a volume flow rate set point, a preferred conversion means 248 is one which fulfills the general condition:

$$FU_{47} = FS_7 \sqrt{\frac{K_3}{DU_9}}$$

where
$FU_{47}$ =volume flow set point = signal 249,
$FS_7$ =mass flow set point = signal 246,
$DU_9$ =density = signal 250, and
$K_3$ =a constant.

A switch means 252 makes it possible, either manually or automatically, to select between signal 249 and a set point signal 253 for use as the generated major comonomer set point signal 104. Switch means 252 can be automatically actuated by, for example, an error signal 902 indicating a malfunction in the generation of signal 249, and, whenever signal 902 is present, will provide a signal 104 equal to signal 253.

In accordance with the illustrated method of generating signal 104 the production rate within the reactor 10 is normally controlled by manipulating the major comonomer feed rate. When the major comonomer concentration within the reactor 10 exceeds a preselected high limit, the concentration of major comonomer within the reaction 10 replaces the production rate set point as the factor controlling the major comonomer feed rate. When the major comonomer concentration within the reactor 10 falls below the preselected high limit and the production rate is sufficiently near the normal production rate set point level, control is automatically switched back to the normal polymer production rate control. In addition, high and low limits can be imposed on the major comonomer feed rate in order to prevent windup in the high limit major comonomer controller 225. An alarm system can also be actuated whenever the major comonomer concentration high limit is exceeded and the switching signal 237 is actuated.

A proportional-integral derivative controller means 225, utilizing the major comonomer concentration signal 227 as the measurement input and the major comonomer concentration set point signal 205 as the set point, generates an output signal 256 representative of the mass flow rate of recycle diluent necessary to maintain the major comonomer concentration represented by the set point signal 205. A filtering means 257 filters the output signal 256 to produce a filtered output signal 258 suitable for control purposes.

Figure 5:
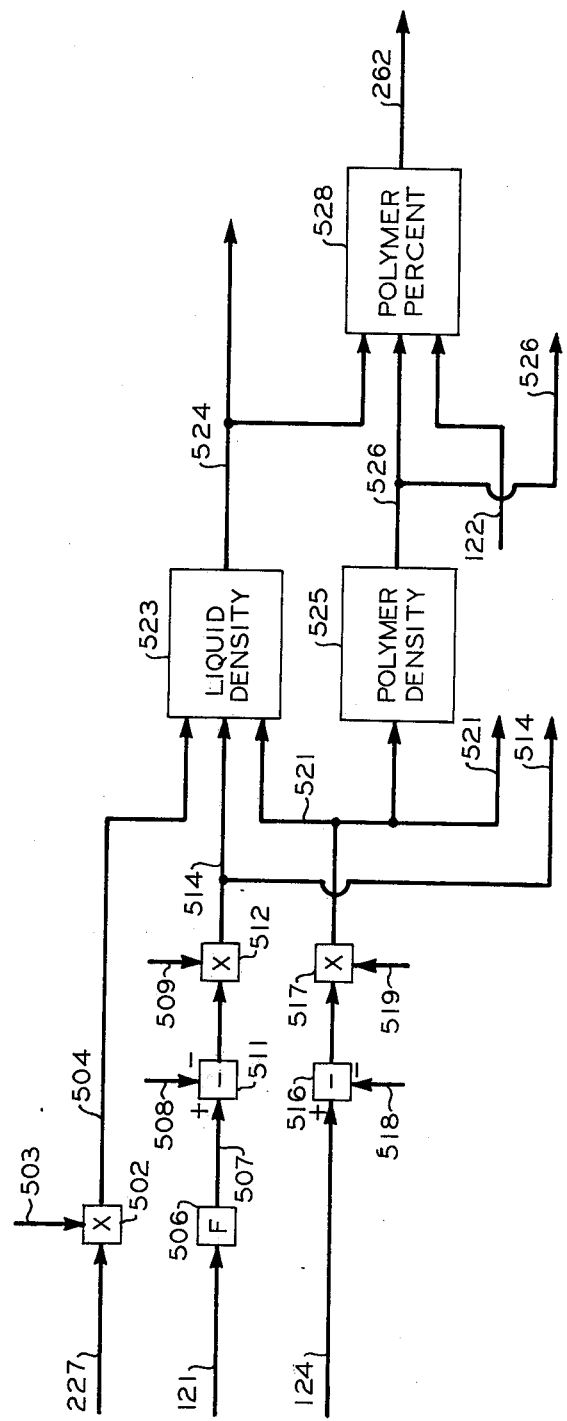
FIG. 5 is a schematic block diagram and flow chart of a portion of the control system which generates a signal representative of the density of liquid within the reactor, a signal representative of the density of polymer within the reactor, and a signal representative of the percent of polymer within the reactor.

A high solids concentration proportional-integral-derivative controller means 261 utilizes a solids concentration signal 262, representative of the concentration of solids within the reactor 10, as an input. Although a signal 262 representative of the solids concentration within the reactor 10 can be generated in any manner capable of producing an acceptably accurate signal, a preferred technique for generating signal 262 is illustrated in FIG. 5. The set point signal 263 for the controller 261 is generated by a subtracting means 264 which subtracts a bias signal 265 from a solids concentration high limit signal 266, representative of the highest concentration of solids within the reactor 10 which can be safely tolerated. The output signal 267 of the high solids controller means 261 is filtered by a filtering means 268 to produce a filtered output signal 269 suitable for control purposes. When the output signal 269 is selected to control the recycle diluent flow rate, the controller will act to bring the solids concentration within the reactor 10 to a safe margin, represented by the bias signal 265, below the high solids concentration limit represented by signal 266.

A subtracting means 271 subtracts the solids concentration high limit signal 266 from the solids concentration signal 262 to generate a signal 272 representative of the amount by which the concentration of solids within the reactor exceeds the high limit set point signal 266. When the concentration of solids within the reactor 10 is lower than the preselected high limit, signal 272 will be less than zero. If signal 272 becomes greater than or equal to zero, indicating a solids concentration within the reactor 10 equal to or in excess of the preselected high limit, a comparison means 273 will generate a switching signal 274. A dead band contrast or other similar means can be incorporated into the comparison means 273 to prevent discontinuation of the switching signal 274 until the signal 272 falls to a preselected value below zero.

Adding means 276, subtracting means 277, and adding means 178 combine to produce a signal 281 which is equal to the sum of signal 272 and the major comonomer concentration signal 227 minus the sum of the major comonomer set point signal 205 and a bias signal 282. In other terms, signal 281 represents the amount by which the major comonomer concentration within the reactor 10 exceeds the major comonomer set point signal, less the amount by which the solids high limit signal exceeds the solids concentration within the reactor 10, less the bias signal 282. When signal 281 is less than or equal to a specified constant $R_4$ a comparison means 283 produces a switching signal 284. The value of the constant $K_4$ is chosen so that a signal 281 less than or equal to $K_4$ is indicative of a solids concentration below the preselected high limit and a major comonomer concentration near the major comonomer concentration set point value.

An automatically actuated signal selecting switch means 291 selects between signals 258 and 269 to produce a diluent mass flow set point signal 292. The operation of the automatically actuated signal selecting switch means 291 is such that whenever switching signal 274 is present, signal 269 will be selected as the diluent mass flow set point signal 292. In the absence of a switching signal 274 and with a switching signal 284 present, signal 258 will be selected as the diluent mass flow set point signal 292. When neither switching signal 274 nor switching signal 284 is present the switch means 291 will remain in its previous condition.

Figure 3:
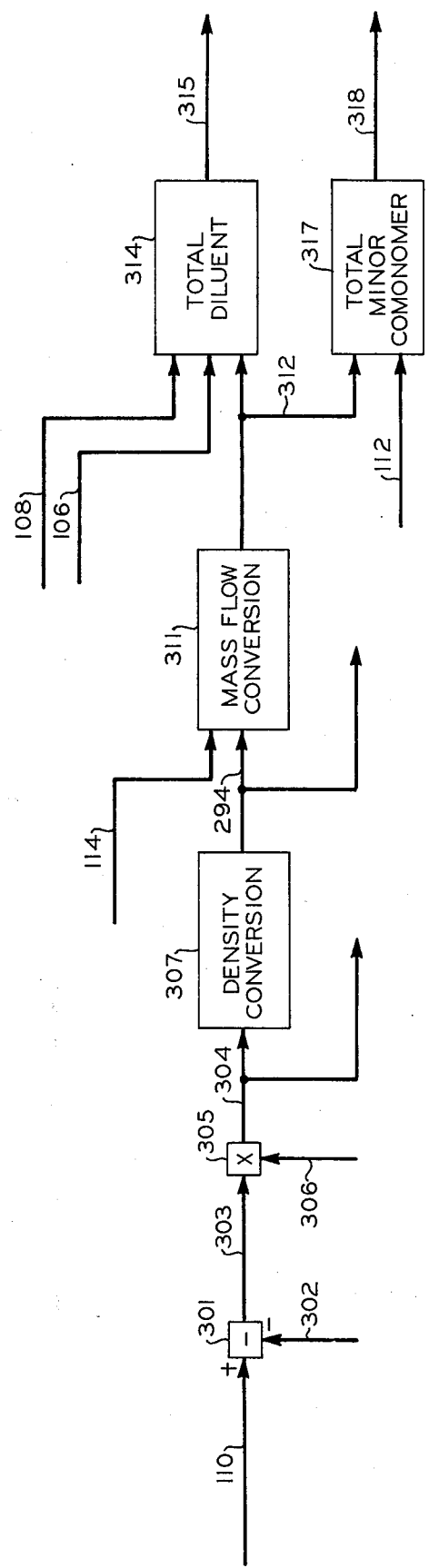
FIG. 3 is a schematic block diagram and flow chart of a portion of the control system which generates signals representative of the total flow of diluent to the reactor and a signal representative of the rate of total minor comonomer feed to the reactor.

A volume flow conversion means 293 utilizes a diluent density signal 294 to produce a diluent volume flow set point signal 295. Although the diluent density signal can be established by measurement or by any other suitable means, a preferred technique for generating the diluent density signal 294 is illustrated in FIG. 3. In general, the volume flow conversion means can be any means which fulfills the general condition:

$$FU_{45} = CO_{45} \sqrt{\frac{K_5}{DU_{10}}},$$

where
$FU_{45}$ = diluent volume flow set point = signal 295,
$CO_{45}$ = diluent mass flow set point = signal 292,
$du_{10}$ = diluent density = signal 294, and
$K_5$ = a constant.

A switch means 297 permits either automatic or manual selection between signal 295 and a set point signal 298 for use as the generated recycle diluent flow set point signal 116. Switch means 297 can be automatically actuated by, for example, an error signal 903 indicating a malfunction in the generation of signal 295, and, whenever the error signal 903 is present, will provide a signal 116 equal to signal 298.

In the generation of the recycle diluent set point signal 116 the concentration of major comonomer within the reactor 10 is normally controlled by manipulating the recycle diluent feed rate. When the major comonomer concentration increases above the set point, the recycle diluent flow is decreased by the operation of the proportional-integral-derivative controller 255. Likewise, when the major comonomer concentration decreases below the set point, recycle diluent flow is increased. The solids concentration in the reactor is continuously monitored. When the solids concentration exceeds the preselected high limit, control responsibility automatically switches to the high solids controller 261, and the recycle diluent flow rate is manipulated to control solids concentration. The recycle diluent flow rate is increased by controller 261 in order to facilitate the removal of polymerized solids from the reactor by decreasing the reactor residence time. This mode of control continues until the solids concentration is below the preselected high limit and the major comonomer concentration is near the set point. Control is then automatically returned to the normal major comonomer concentration control mode.

In addition, it is ordinarily desirable to impose high and low limits on the recycle diluent flow in order to prevent windup of the controllers, and to provide an alarm system associated with the signal selecting switch means 291 which will actuate an alarm when the solids concentration limit is exceeded.

The recycle diluent density, the total mass of minor comonomer fed to the reactor, and the total diluent mass flow rate are preferably determined as illustrated in FIG. 3. A subtracting means 301 subtracts a reference temperature signal 302 from the recycle diluent temperature signal 110 to generate a referenced recycle diluent temperature signal 303. A multiplying means 305 then multiplies signal 303 by a scaling factor signal 306 to yield a referenced and scaled recycle diluent temperature signal 304. A density conversion means 307, utilizing the referenced and scaled recycle diluent temperature signal 304 as an input, generates the recycle diluent density signal 294. Although the density conversion means 307 can be any suitable means for generating the density signal 294, a preferred density conversion means 307 is one which fulfills the general condition:

$$DU_{10} = K_6 + K_7(TU_6) - K_8(TU_6)^2,$$

where
$DU_{10}$ = recycle diluent density = signal 294,
$TU_6$ = referenced and scaled recycle diluent temperature = signal 304, and
$K_6$, $K_7$, and $K_8$ = constants.

Under conditions where the pressure of the recycle diluent stream is subject to significant variation, a pressure term and a pressure-temperature product term can be added to the equation.

A mass flow conversion means 311, utilizing the recyle diluent density signal 294 and the recycle diluent and minor comonomer flow rate signal 114 as inputs thereto, generates a recycle diluent and minor comonomer mass flow rate signal 312. Although the mass flow conversion means 311 can utilize any technique for obtaining a suitable recycle diluent and minor comonomer mass flow rate signal 312 a preferred mass flow conversion means 311 is one which fulfills the general condition:

$$FU_{33} = K_9 \times IN_{11} \sqrt{\frac{DU_{10}}{K_{10}}},$$

where
- $FU_{33}$ = recycle diluent and minor comonomer mass flow rate = signal 312,
- $IN_{11}$ = recycle diluent and minor comonomer flow rate = signal 114,
- $DU_{10}$ = recycle diluent density = signal 294, and $K_9$ and $K_{10}$ = constants.

A total diluent mass flow determination means 314 generates a total diluent mass flow signal 315 in response to the recycle diluent and minor comonomer flow rate signal 312, the minor comonomer flow rate signal 108, and the fresh diluent flow rate signal 106. Although the total diluent mass flow determination means 314 can be any means utilizing any acceptable technique to generate a total diluent mass flow signal 315, a preferred means for use with a system in which the fresh diluent flow rate signal 106 and minor comonomer flow rate signal 108 are small compared to the recycle diluent and minor comonomer flow rate signal 312 is a mass flow determination means 314 which fulfills the general condition:

$$FU_4 = FU_{33} + FU_{32} - FU_3,$$

where
- $FU_4$ = total diluent mass flow = signal 315,
- $FU_{33}$ = recycle diluent and minor comonomer mass flow rate = signal 312,
- $FU_{32}$ = fresh diluent flow rate = signal 106, and
- $FU_3$ = minor comonomer flow rate = signal 108.

Where either the fresh diluent flow rate signal 106 or the minor comonomer flow rate signal 108 is large enough that a density determination and mass flow conversion would yield a corrected signal differing from the uncorrected signal by an amount which is significant compared to the recycle diluent and minor comonomer flow rate signal 312, a more accurate determination of the total diluent mass flow signal 315 could be made by correcting signal 106 or signal 108 in the same manner that signal 110 has been corrected to yield signal 312. For reaction systems in which the fresh diluent flow rate and the comonomer flow rate are small in comparison to the recycle diluent flow rate, however, the increase in accuracy resulting from mass flow correction of the minor comonomer and fresh diluent flow rates is not justified by the expense of making the additional temperature measurements required.

A total comonomer determination means 317 generates a total comonomer mass flow signal 318 in response to the recycle diluent and minor comonomer mass flow rate signal 312 and the minor comonomer concentration signal 112. Although the total minor comonomer determination means 317 can be a means utilizing any suitable technique for generating a total comonomer mass flow signal 318, a preferred means is one which fulfills the general condition:

$$FU_9 = \frac{(FU_{33})(IN_3)}{K_{11}},$$

where
- $FU_9$ = total minor comonomer mass flow = signal 318,
- $FU_{33}$ = recycle diluent and minor comonomer mass flow rate = signal 312,
- $IN_3$ = minor comonomer concentration = signal 112, and
- $K_{11}$ = a constant.

By utilizing the recycle diluent and minor comonomer mass flow rate signal 312 in conjunction with the minor comonomer concentration signal 112 in the generation of the minor comonomer mass flow signal 318, the amount of minor comonomer contained in the recycled diluent as well as the amount of freshly added minor comonomer is taken into account in determining the minor comonomer mass flow signal 318.

FIG. 4 illustrates the manner in which the minor comonomer conversion rate signal 202, representative of the rate at which the minor comonomer is being polymerized within the reaction zone 10, is generated. A conversion fraction determination means 402 generates a minor comonomer conversion fraction signal 403, representative of the weight fraction of comonomer which is polymerized, in response to the total minor comonomer mass flow signal 318, a feed back input signal of the minor comonomer conversion rate signal 202, and a minor comonomer accumulation rate signal 404 representative of the rate at which the minor comonomer is accumulating within the reactor 10. Although the conversion factor determination means can be any suitable means for generating a suitable minor comonomer conversion fraction signal 403, a preferred means is one which fulfills the general condition:

$$FU_{26} = \frac{FU_8}{FU_9 - AC_4},$$

where
- $FU_{26}$ = minor comonomer accumulation rate = signal 403,
- $FU_8$ = minor comonomer conversion rate = signal 202,
- $FU_9$ = total minor comonomer mass flow = signal 318, and
- $AC_4$ = accumulation rate of minor comonomer in the reactor = signal 404.

A filter means 406 filters signal 403 to produce a filtered minor comonomer conversion fraction signal 407.

A multiplying means 408 multiplies the minor comonomer accumulation rate signal 404 by a proportional update constant 409 to produce a minor comonomer balance proportional update signal 411. A lag means 412 operates upon signal 411 to produce a filtered minor comonomer balance proportional update signal 413. An integrator means 415 integrates the minor comonomer accumulation rate signal 404 to produce an integrated minor comonomer balance output signal 416.

A conversion rate determination means 418, utilizing signals 318, 407, 413, and 416 as inputs, generates the minor comonomer conversion rate signal 202. Although any conversion rate determination means 418 capable of producing a minor comonomer conversion rate signal 202 can be used, a preferred means is one which fulfills the general condition:

$$FU_8 = FU_9 \times FU_{15} + FF_4 + FU_{30},$$

where
- $FU_8$ = minor comonomer conversion rate = signal 202,
- $FU_9$ = total minor comonomer mass flow = signal 318,
- $FU_{15}$ = filtered minor comonomer conversion fraction = signal 407,
- $FF_4$ = filtered minor comonomer balance proportional update term = signal 413, and
- $FU_{30}$ = integrated minor comonomer balance output = signal 416.

A subtracting means 421 and a subtracting means 422 respectively subtract the minor comonomer conversion rate signal 202 and a minor comonomer effluent flow signal 424, representative of the amount of minor comonomer exiting the reaction zone with the product, from the total minor comonomer mass flow signal 318 to produce the minor comonomer accumulation rate signal 404. An integration means 425, utilizing the minor comonomer accumulation rate signal 404 and a filtered minor comonomer analysis update signal 426 as inputs thereto, generates a minor comonomer mass reactor content signal 428.

A concentration determination means 431 generates a minor comonomer reactor concentration signal 432 in response to the minor comonomer mass reactor content signal 428 and a filtered reactor liquid mass content signal 433. Although the filtered reactor liquid mass signal 433 can be generated utilizing any suitable means capable of producing the desired signal, a preferred technique for generating the filtered reactor liquid mass signal 433 is illustrated in FIG. 7. Although the concentration determination means 431 can be any means capable of producing the output minor comonomer reactor concentration signal 432, a preferred means is one which fulfills the general condition:

$$AU_{22} = \frac{K_{12}(MU_7)}{MF_1},$$

where
- $AU_{22}$ = minor comonomer reactor concentration = signal 432,
- $MU_7$ = minor comonomer mass reactor content = signal 428,
- $MF_1$ = filtered reactor liquid mass = signal 433, and
- $K_{12}$ = a constant.

A minor comonomer effluent flow determination means generates the minor comonomer effluent flow signal 424 in response to the minor comonomer reactor concentration signal 432 and a reactor liquid effluent flow rate signal 436. While the reactor liquid effluent flow rate signal 436 can be measured or generated by any suitable means, a preferred technique for generating signal 436 is illustrated in FIG. 7. The minor comonomer effluent flow determination means 435 can be any means suitable for producing the required signal. A preferred means is one which fulfills the general condition:

$$FU_{31} = \frac{(AU_{22})(FU_{13})}{K_{13}},$$

where
- $FU_{31}$ = minor comonomer effluent flow = signal 424,
- $AU_{22}$ = minor comonomer reactor concentration = signal 432,
- $FU_{13}$ = reactor liquid effluent flow rate = signal 436, and
- $K_{13}$ = a constant.

A filter means 438 produces a filtered minor comonomer reactor concentration signal 439 in response to signal 432. A delay means 440 introduces a delay or dead time in the transmission of signal 439 to produce a filtered and delayed minor comonomer reactor concentration signal 441. A subtracting means 443 subtracts the filtered and delayed minor comonomer reactor concentration signal 441 from the minor comonomer off-gas concentration signal 134. Since nearly all liquid constituents withdrawn from the reactor can be expected to leave the flash tank 32 via the overhead stream 34, the minor comonomer offgas concentration signal 134 is capable of providing a periodic indication of recent minor comonomer concentration in the reactor liquid. The output signal 444 from the subtracting means 443 therefore represents the difference between the measured minor comonomer analysis concentration and generated concentration. Filtering of signal 44 by filtering means 446 and filter means 447 results in a filtered minor comonomer analysis concentration and generated concentration difference signal 449. An adding means 451 adds signal 449 to the minor comonomer reactor concentration signal 432 to produce an updated minor comonomer reactor concentration signal 452. An analysis update means 453 produces a minor comonomer analysis update signal 454 in response to the filtered reactor liquid mass signal 433, the minor comonomer mass reactor content signal 428, and the updated minor comonomer reactor concentration signal 452. A filtering means 455 then filters signal 454 to produce the filtered minor comonomer analysis update signal 426. Although the analysis update means 453 can be any suitable means for producing a minor comonomer analysis update signal 454, a preferred means is one which fulfills the general condition:

$$MU_6 = \frac{(MF_1)(AU_4) - MU_7}{K_{14}},$$

where
- $MU_6$ = minor comonomer analysis update = signal 454,
- $MF_1$ = filtered reactor liquid mass signal = signal 433,
- $AU_4$ = updated minor comonomer reactor concentration = signal 452,
- $MU_7$ = minor comonomer mass reactor content = signal 428, and
- $K_{14}$ = a constant.

As is readily observable from the foregoing explanation, the minor comonomer conversion rate signal 202 is generated primarily in response to a material balance with additional update information being provided by periodic chromatographic analysis of the flash tank off-gas.

Referring now to FIG. 5, the reactor liquid phase major comonomer weight percent signal 227 is accepted by a multiplying means 502 and is multiplied by a suitable constant 503 to produce a reactor liquid phase major comonomer weight fraction signal 504. Although a suitable signal 227 representative of the weight percent of major comonomer within the liquid phase of the reactor contents can be measured or generated by any suitable means, a preferred technique for generating signal 227 is illustrated in FIG. 7. The reactor pressure signal 121 is filtered by a filtering means 506 to produce a filtered reactor pressure signal 507. A subtracting means 511 and a multiplying means 512 subtract a reference pressure constant signal 508 from the filtered reactor pressure signal 507 and multiply the remainder by a scaling constant signal 509 to produce a referenced reactor pressure signal 514.

Referencing of the internal temperature signal 124 is accomplished by subtracting means 516 and multiplying means 517 which subtract a reference temperature constant signal 518 from the internal reactor temperature signal 124 and multiply the remainder by a scaling constant signal 519 to produce a referenced reactor temperature signal 521.

A liquid density determination means 523 generates a reactor liquid density signal 524 in response to the reactor liquid phase major comonomer weight fraction signal 504, the referenced reactor pressure signal 514, and the referenced reactor temperature signal 521. Although the liquid density determination means 523 can be any means suitable for producing a reactor liquid density signal 524, a preferred means is one which fulfills the general conditions:

$$DU_1 = K_{15} - K_{16}(TU_1) - K_{17}(AU_1) + K_{18}(PU_2) - K_{19}(TU_1)(AU_1) - K_{20}(AU_1)^2 - K_{21}(TU_1)^2 + K_{22}(TU_1)(AU_1)(PU_2) + K_{23}(PU_2)(AU_1)^2 - K_{24}(TU_1)(AU_1)^2 - K_{25}(TU_1)^3,$$

where
$DU_1$ = reactor liquid density = signal 524,
$TU_1$ = referenced reactor temperature = signal 521,
$AU_1$ = reactor liquid phase major comonomer weight fraction = signal 504,
$PU_2$ = referenced reactor pressure = signal 514, and
$K_{15}$, $K_{16}$, $K_{17}$, $K_{18}$, $K_{19}$, $K_{20}$, $K_{21}$, $K_{22}$, $K_{23}$, $K_{24}$, and $K_{25}$ = constants.

A polymer density determination means 525 produces a reactor polymer density signal 526 in response to the referenced reactor temperature signal 521. Although any polymer density determination means 525 can be utilized, a preferred means is one which fulfills the general condition:

$$DU_3 = K_{26} - K_{27}(TU_1),$$

where
$DU_3$ = density of polymer within the reactor = signal 526,
$TU_1$ = referenced reactor temperature = signal 521, and
$K_{26}$ and $K_{27}$ = constants.

A polymer percent determination means 528 produces the solids concentration signal 262 representative of the weight percent of polymer within the reactor 10. The polymer percent determination means 528 utilizes the reactor liquid density signal 524, the reactor polymer density signal 526, and the slurry density signal 122 as inputs. Although any polymer percent determination means 528 productive of a suitable solids concentration signal 262 can be utilized, a preferred means is one which fulfills the general condition:

$$DU_2 = K_{28} + K_{29}\frac{DU_3(IN_5 - DU_1)}{IN_5(DU_3 - DU_1)},$$

where
$DU_2$ = weight percent of polymer within the reactor = signal 262,
$DU_3$ = reactor polymer density = signal 526,
$IN_5$ = reactor slurry density = signal 122,
$DU_1$ = reactor liquid density = signal 524, and
$K_{28}$ and $K_{29}$ = constants.

In conjunction with the determination of the weight percent of polymer within the reactor 10, the signal generation technique of FIG. 5 illustrates the manner in which signals representative of the liquid and polymer density within the reactor are generated. In general, the weight percent of solids within the reactor is equal to the ratio of the polymer density to slurry density, multiplied by the volume fraction of polymer. The volume fraction is generally equal to the difference between the slurry and liquid densities divided by the difference between the polymer and liquid densities. The effects of temperature, pressure, and major comonomer concentration are taken into account in generating the liquid density signal, and the effect of temperature is taken into account in calculating the polymer density signal. Although the constants $K_{15}-K_{27}$ can be determined by any suitable technique, a preferred method is by least squares curve fitting of accumulated data.

Referring now to FIG. 6, a multiplying means 601 multiplies the major comonomer pressure signal 101 by a scaling constant 602 to produce a scaled major comonomer feed pressure signal 603. In a similar manner, a multiplying means 604 multiplies the major comonomer temperature signal 102 by a scaling constant 605 to produce a scaled major comonomer feed temperature signal 606. A major comonomer density determination means 607 generates the major comonomer density signal 250 in response to the scaled major comonomer feed pressure signal 603 and the scaled major comonomer feed temperature signal 606. Although the density determination means 607 can be any means productive of a major comonomer density signal 250, a preferred means is one which fulfills the general condition:

$$DU_9 = -K_{30}+K_{31}(TU_2)+K_{32}(PU_3)+K_{33}(TU_2)^2+K_{34}(PU_3)^2-K_{35}(TU_2)(PU_3),$$

where
$DU_9$ = major comonomer feed density = signal 250,
$TU_2$ = scaled major comonomer feed temperature = signal 606,
$PU_3$ = scaled major comonomer feed pressure = signal 603, and
$K_{30}$, $K_{31}$, $K_{32}$, $K_{33}$, $K_{34}$, and $K_{35}$ = constants.

A corrected mass flow determination means 608 produces a major comonomer mass flow rate signal 609 in response to the major comonomer density signal 250 and the major comonomer feed flow rate signal 103. Although any mass flow rate determination means 608 can be utilized, a preferred means is one which fulfills the general condition:

$$FU_2 = IN_6 \sqrt{\frac{DU_6}{K_{36}}},$$

where
$FU_2$ = major comonomer feed mass flow rate = signal 609,
$IN_6$ = measured major comonomer flow rate = signal 103,
$DU_6$ = major comonomer density = signal 250, and
$K_{36}$ = a constant.

As can be seen from the foregoing description, the mass flow of major comonomer is determined by multiplying the measured value by a density correction factor. The correction factor is, in general, the square root of the ratio of major comonomer density at flowing conditions to major comonomer density at meter reference conditions. The correction mass flow rate of major comonomer is subsequently utilized in determining the weight percent of major comonomer in the liquid phase of the reactor contents, for heat balance production determinations, and for determining the ratio of minor comonomer to a major comonomer entering the reactor 10.

Referring now to FIG. 7, a density determination means 701 generates a reactor liquid phase diluent density signal 702 in response to the referenced reactor temperature signal 521 and the referenced reactor pressure signal 514. Although any density determination means productive of a reactor liquid phase diluent density signal 702 can be used, a preferred means is one which fulfills the general condition:

$$DU_5 = K_{37}(TU_1) + K_{38}(PU_2) + K_{39}(TU_1)(PU_2) - K_{40}(TU_1)^2,$$

where
$DU_5$ = reactor liquid phase diluent density = signal 702,
$TU_1$ = referenced reactor temperature = signal 521,
$TU_2$ = referenced reactor pressure = signal 514, and
$K_{37}$, $K_{38}$, $K_{39}$, and $K_{40}$ = constants.

A major comonomer density determination means 704 generates a reactor liquid phase major comonomer density signal 705 in response to the reactor liquid phase diluent density signal 702, a feedback of the reactor liquid phase major comonomer weight percent signal 227, and the reactor liquid density signal 524. Although any density determination means 704 suitable for production of the reactor liquid phase major comonomer density signal 705 can be utilized, a preferred means is one which fulfills the general condition:

$$DU_7 = K_{41} \frac{(AU_2)(DU_1)(DU_5)}{DU_5 - DU_1 + \frac{(AU_2)(DU_1)}{K_{41}}},$$

where
$DU_7$ = reactor liquid phase major comonomer density = signal 705,
$AU_2$ = reactor liquid phase major comonomer weight percent = signal 227,
$DU_1$ = reactor polymer density = signal 524,
$DU_5$ = reactor liquid phase diluent density = signal 702, and
$K_{41}$ = a constant.

A slurry flow determination means 708 produces a reactor effluent slurry flow rate signal 709 representative of the mass flow of slurry from the reator 10 to the flash tank 32. The effluent slurry flow rate signal 709 is generated in response to the total minor comonomer mass flow signal 318, the minor comonomer conversion rate signal 202, the filtered production rate signal 216, the reactor liquid phase diluent density signal 702, the reactor liquid phase major comonomer density signal 705, the reactor polymer density signal 526, the total diluent mass flow signal 315, the major comonomer mass flow rate signal 609, and a production rate of polymer from ethylene signal 707. Signal 707 is representative of the rate at which major comonomer is being polymerized to produce polymer and can be derived in any suitable manner. A preferred technique for generating the signal, however, is illustrated in FIG. 8. While the slurry flow determination means 708 can be any means capable of producing the desired reactor effluent slurry flow rate signal 709, a preferred means is one which fulfills the general condition:

$$FU_{16} = K_{42} \left[ \frac{FU_4 + FU_9 - FU_8}{DU_5} + \frac{FU_2 - FU_7}{DU_7} + \frac{FF_3}{DU_3} \right],$$

where
$FU_{16}$ = reactor effluent slurry flow rate = signal 709,
$FU_4$ = total diluent mass flow = signal 315,
$FU_9$ = total minor comonomer mass flow = signal 318,
$FU_8$ = minor comonomer conversion rate = signal 202,
$DU_5$ = reactor liquid phase diluent density = signal 702,
$FU_2$ = major comonomer mass flow rate = signal 609,
$FU_7$ = production rate of polymer from major comonomer = signal 707,
$DU_7$ = reactor liquid phase major comonomer density = signal 705,
$FF_3$ = filtered production rate = signal 216,
$DU_3$ = reactor polymer density = signal 526, and
$K_{42}$ = a constant.

A settling efficiency determination means 711 produces a settling efficiency signal 712 in response to the total diluent mass flow signal 315, the major comonomer mass flow rate signal 609, the minor comonomer flow rate signal 108, and a feedback effluent major comonomer mass flow rate signal 722 representative of the mass flow rate of major comonomer from the reactor as reactor effluent. Although any settling efficiency determination means 711 capable of producing the desired settling efficiency signal 712 representative of the percent of polymer in the reactor 10 which has settled for removal to the flash tank 32 through conduit 31 can be utilized, a preferred settling efficiency determination means 711 is one which fulfills the general condition:

$$SE_1 = K_{43} \frac{FU_2 - FU_{10} + IN_9}{FU_2 + IN_9 + FU_4},$$

where
$SE_1$ = settling efficiency = signal 712,
$FU_2$ = major comonomer mass flow rate = signal 609,
$FU_{10}$ = effluent major comonomer mass flow rate = signal 722,
$IN_9$ = minor comonomer flow rate = signal 108,
$FU_4$ = total diluent mass flow = signal 315, and
$K_{43}$ = a constant.

A lag means 714 operates on signal 712 to generate a filtered settling efficiency signal 713.

A liquid volume fraction determination means 716 produces an effluent liquid volume fraction signal 717 representative of the volume fraction of liquid in the effluent from the reactor 10 responsive to the reactor liquid density signal 524, the reactor polymer density signal 526, and the filtered settling efficiency signal 713. Although any suitable liquid volume fraction determination means can be utilized, a preferred means is one which fulfills the general equation:

$$AU_7 = \frac{DU_3(K_{44}\ SF_1)}{DU_3(K_{44} - SF_1) + (SF_1)(DU_1)},$$

where
$AU_7$ = effluent liquid volume fraction = signal 717,
$DU_3$ = reactor polymer density = signal 526,
$SF_1$ = filtered settling efficiency = signal 713,
$DU_1$ = reactor liquid density = signal 524, and
$K_{44}$ = a constant.

In response to the reactor effluent slurry flow rate signal 709, the reactor liquid density signal 524, and the effluent liquid volume fraction signal 717, a liquid flow rate determination means 719 generates the reactor liquid effluent flow rate signal 436. While any suitable liquid flow rate determination means 719 can be used, a preferred means is one which fulfills the general condition:

$$FU_{13} = K_{45}(DU_1)(FU_{16})(AU_7),$$

where
$FU_{13}$ = reactor liquid effluent flow rate = signal 436,
$DU_1$ = reactor liquid density = signal 524,
$FU_{16}$ = reactor effluent slurry flow rate = signal 709,
$AU_7$ = effluent liquid volume fraction = signal 717, and
$K_{45}$ = a constant.

In response to the reactor liquid effluent flow rate signal 436 and an effluent major comonomer weight percent signal 723 an effluent major comonomer flow rate determination means 721 generates the effluent major comonomer mass flow rate signal 722. While any suitable effluent major comonomer flow rate determination means 721 can be used, a preferred means is one which fulfills the general condition:

$$FU_{10} = K_{46}(Au_8)(FU_{13}),$$

where
$FU_{10}$ = effluent major comonomer mass flow rate = signal 722,
$AU_8$ = effluent major comonomer weight percent = signal 723,
$FU_{13}$ = reactor liquid effluent flow rate = signal 436.

In response to signal 707 representative of the production rate of polymer from major comonomer, the major comonomer mass flow rate signal 609, and the effluent major comonomer mass flow rate signal 722, a major comonomer accumulation determination means 725 generates a reactor major comonomer accumulation signal 726 representative of the rate at which the major comonomer is accumulating within the reactor 10. Although any determination means 725 capable of producing the required accumulation rate signal 726 can be utilized, a preferred means is one which fulfills the general condition:

$$AC_1 = FU_2 - FU_7 - FU_{10},$$

where
$AC_1$ = reactor major comonomer accumulation rate = signal 726,
$FU_2$ = major comonomer mass flow rate = signal 609,
$FU_7$ = production rate of polymer from major comonomer = signal 707, and
$FU_{10}$ = effluent major comonomer mass flow rate = signal 722.

An adding means 727 adds to the reactor major comonomer accumulation rate signal 726 a filtered reactor major comonomer update signal 728 to produce an updated reactor major comonomer accumulation rate signal 729. An integrator means 731 generates a reactor major comonomer mass content signal 732 in response to the updated reactor major comonomer accumulation rate signal 729.

A liquid mass determination means 734 produces a reactor liquid mass signal 735 in response to the reactor solids concentration signal 262 and the slurry density signal 122. Although any liquid mass determination means suitable for producing the desired reactor liquid mass signal 735 can be utilized, a preferred means is one which fulfills the general condition:

$$MU_4 = K_{47}(IN_5)(K_{48} - DU_2),$$

where
$MU_4$ = reactor liquid mass = signal 735,
$IN_5$ = slurry density = signal 122,
$DU_2$ = solids concentration = signal 262, and
$K_{47}$ and $K_{48}$ = constants.

A filter means 736 operates on the reactor liquid mass signal 735 to produce the filtered reactor liquid mass signal 433.

A major comonomer mass update generation means 738 generates a reactor major comonomer mass update signal 739 in response to the reactor liquid phase major comonomer weight percent signal 227, the filtered reactor liquid mass signal 433, and the reactor comonomer mass content signal 732. Although any generation means 738 suitable for producing the reactor major comonomer mass update signal 739 can be utilized, a preferred means is one which fulfills the general condition:

$$MU_5 = \frac{(MF_1)(AU_2)}{K_{49} - MU_1},$$

where
$MU_5$ = reactor major comonomer mass update term = signal 739,
$MF_1$ = filtered reactor liquid mass = signal 433,
$AU_2$ = reactor liquid phase major comonomer weight percent = signal 227, $MU_1$ = reactor comonomer mass content = signal 732, and $K_{49}$ = a constant.

A filter means 740 produces the filtered reactor major comonomer update signal 728 in response to the reactor major comonomer mass update signal 739.

A major comonomer weight percent determination means 742 generates the effluent major comonomer weight percent signal 723 in response to the filtered reactor liquid mass signal 433 and the reactor comonomer mass content signal 732. Although any major comonomer weight percent determination means 742 which will produce the desired effluent major comonomer weight percent signal 723 can be utilized, a preferred means is one which fulfills the general condition:

$$AU_8 = K_{50} \frac{MU_1}{MF_1},$$

where $AU_8$ = effluent major comonomer weight percent = signal 723, $MU_1$ = reactor comonomer mass content = signal 732, $MF_1$ = filtered reactor liquid mass = signal 433, and $K_{50}$ = a constant.

A filter means 743 produces a filtered effluent major comonomer weight percent signal 744 in response to the effluent major comonomer weight percent signal 723. A delay means 745 produces a filtered and delayed effluent major comonomer weight percent signal 746 in response to the filtered signal 744 by imparting a delay or dead time thereto.

A weight percent update determination means 748 generates a major comonomer weight percent update signal 749 in response to the filtered and delayed effluent major comonomer weight percent signal 723 and the major comonomer off-gas concentration signal 133. Although any determination means 748 suitable for producing the major comonomer weight percent update signal 749 can be used, a preferred means is one which fulfills the general condition:

$$AU_{10} = IN_1 - AF_5,$$

where $AU_{10}$ = *major comonomer weight percent update term* = *signal 749*, $IN_1$ = measured major comonomer off-gas concentration = signal 133, and $AF_5$ = filtered and delayed effluent major comonomer weight percent = signal 746.

A filter means 751 and a filter means 752 successively filter the major comonomer weight percent update signal 749 to produce a filtered major comonomer weight percent update term 753.

An adding means 755 adds the filtered major comonomer weight percent update signal 753 to the effluent major comonomer weight percent signal 723 to produce the reactor liquid phase major comonomer weight percent signal 227.

As can be seen from the above description, the generation of the computed major comonomer concentration in the liquid phase of the reactor 10 also generates signals representative of the density of diluent in the liquid phase, the density of major comonomer in the liquid phase, the flow rate of reactor slurry to effluent, the flow rate of reactor liquid to effluent, the flow rate of major comonomer to effluent, the volume fraction of liquid within the effluent, and the settling efficiency of polymer within the reactor 10. In general, the weight percent of major comonomer is equal to the weight of major comonomer in the reactor divided by the weight of liquid in the reactor, all multiplied by 100. The mass of liquid in the reactor is equal to the slurry density multiplied by the weight fraction of liquid in the reactor, and this in turn multiplied by the volume of the reactor. The determination of the amount of major comonomer in the reactor can be generally stated in terms of a differential equation for the major comonomer mass balance in which the accumulation of major comonomer in the reactor is equal to the major comonomer that flows into the reactor minus the major comonomer that flow out of the reactor minus the major comonomer that reacts to give polymer. An update term is used to force the generated major comonomer weight percent signal to correlate with a measured value.

Referring now to FIG. 8, a delay means 801 imparts a delay or dead time to the coolant inlet temperature signal 126 to produce a delayed coolant inlet temperature signal 802. In response to the delayed coolant inlet temperature signal 802 and the coolant withdrawal temperature signal 127, a coolant temperature differential determination means 803 generates a coolant temperature differential signal 804 representative of the temperature increase of the coolant after having been circulated through the cooling jacket 25 of the reactor 10. Although any coolant temperature differential determination means 803 which will produce desired coolant temperature differential signal 804 can be used, a preferred means is one which fulfills the general condition:

$$TU_{10} = K_{51}(IN_{20} - TU_9 + K_{52}),$$

where $TU_{10}$ = coolant temperature differential = signal 804, $IN_{20}$ = coolant withdrawal temperature = signal 127, $TU_9$ = delayed coolant inlet temperature = signal 802, and $K_{51}$ and $K_{52}$ = constants.

A filtering means 806 and a filtering means 807 successively act upon the coolant temperature differential signal 804 to produce a filtered coolant temperature differential signal 805.

A multiplying means 809 multiplies the coolant flow rate signal 128 by a scaling and correction factor constant signal 810 to produce a coolant mass flow rate signal 811. A multiplying means 812 multiplies the coolant mass flow rate signal 811 by the filtered coolant temperature differential signal 805 to produce an uncorrected coolant heat removal signal 813. A multiplying means 814 multiplies the uncorrected coolant heat removal signal 813 by a scaling and correction factor constant signal 815 to produce a corrected coolant heat removal signal 816.

In response to the circulating pump power signal 131, a mixing heat determination means 818 produces a mixing heat signal 819 representative of the rate at which heat is added to the reactor contents by the action of the impeller 21 driven by its associated motor 22. Although any mixing heat determination means 818 capable of producing the desired mixing heat signal 819 can be used, a preferred means is one which fulfills the general condition:

$$QU_7 = K_{53}(IN_{24} - K_{54}),$$
where
$QU_7$ = heat added to reactor by mixing = signal 819,
$IN_{24}$ = circulating pump power = signal 131, and
$K_{53}$ and $K_{54}$ = constants.

In response to the filtered coolant temperature differential signal 805, the coolant inlet temperature signal 126, the external reactor temperature signal 123, and the internal reactor temperature signal 124, an ambient heat loss determination means 821 generates an ambient heat loss signal 822 representative of the heat loss from the reactor to its surroundings. Although any ambient heat loss determination means 821 suitable for producing the desired ambient heat loss signal 822 can be used, a preferred means is one which fulfills the general condition:

$$QU_8 = K_{55}(IN_{18} - IN_{23}) + K_{56}\left(IN_{19} + \frac{TU_5}{K_{57}} - IN_{23}\right),$$

where
$QU_8$ = heat loss to ambient = signal 822,
$IN_{18}$ = internal reactor temperature = signal 124,
$IN_{23}$ = external reactor temperature = signal 123,
$IN_{19}$ = coolant inlet temperature = signal 126,
$TU_5$ = filtered coolant temperature differential = signal 805, and
$K_{55}$, $K_{56}$ and $K_{57}$ = constants.

A subtracting means 824 subtracts a reference bias signal 825 from the internal reactor temperature signal 124 to produce a referenced internal reactor temperature signal 826. In response to the referenced internal reactor temperature signal 826, a reactor diluent enthalpy determination means 827 produces a reactor diluent specific enthalphy signal 828 representative of the specific enthalpy of the diluent at the reactor internal temperature. Although any diluent enthalpy determination means 827 which will produce the desired reactor diluent specific enthalpy signal 828 can be used, a preferred means is one which fulfills the general condition:

$$QU_3 = K_{58}(TU_7) + K_{59}(TU_7)^2,$$
where
$QU_3$ = reactor diluent specific enthalpy = signal 828,
$TU_7$ = referenced internal reactor temperature = signal 826, and
$K_{58}$ and $K_{59}$ = constants.

A multiplying means 831 multiplies the referenced and scaled recycle diluent temperature signal 304 by reciprocal scaling factor signal 832 to produce a referenced recycle diluent temperature signal 833. In response to the referenced recycle diluent temperature signal 833, a feed diluent enthalpy determination means 834 produces a feed diluent specific enthalpy signal 835 representative of the specific enthalpy of the diluent feed to the reactor. Although any feed diluent enthalpy determination means 834 suitable for producing the desired feed diluent specific enthalpy signal 835 can be utilized, a preferred means is one which fulfills the general condition:

$$QU_2 = K_{58}(TU_8) + K_{59}(TU_8)^2,$$
where
$QU_2$ = feed diluent specific enthalpy = signal 835,
$TU_8$ = referenced recycle diluent temperature = signal 833,
$K_{58}$ and $K_{59}$ = constants.

In response to the reactor diluent specific enthalpy signal 828, the feed diluent specific enthalpy signal 835, and the total diluent mass flow signal 315, a diluent heat removal determination means 837 generates a diluent heat removal signal 838 representative of the rate at which heat is being removed from the reactor by the diluent. Although any diluent heat removal determination means 837 which is capable of producing the desired diluent heat removal signal 838 can be used, a preferred means is one which fulfills the general condition:

$$QU_4 = K_{60}(FU_4)(QU_3 - QU_2),$$
where
$QU_4$ = removal of heat from reactor by diluent = signal 838,
$FU_4$ = total diluent mass flow = signal 315,
$QU_3$ = reactor diluent specific enthalpy = signal 828,
$QU_2$ = feed diluent specific enthalpy = signal 835, and
$K_{60}$ = a constant.

In response to the referenced internal reactor temperature signal 826, a reactor major comonomer enthalpy determination means 841 generates a reactor major comonomer specific enthalpy signal 842 representative of the specific enthalpy of the major comonomer a the reactor internal temperature. Although any determination means 841 which will produce the desired reactor major comonomer specific enthalpy signal 842 can be used, a preferred means is one which fulfills the general condition:

$$QU_5 = K_{61}(TU_7) - K_{62}(TU_7)^2,$$
where
$QU_5$ = specific enthalpy of major comonomer at reactor temperature = signal 842,
$TU_7$ = referenced internal reactor temperature = signal 826, and $K_{61}$ and $K_{62}$ = constants.

In response to the major comonomer feed temperature signal 102, a feed major comonomer enthalpy determination means 843 generates a feed major comonomer specific enthalpy signal 844 representative of the specific enthalpy of the major comonomer at the temperature of the major comonomer feedstream. Although any determination means 843 which will produce the desired feed major comonomer specific enthalpy signal 844 can be utilized, a preferred means is one which fulfills the general condition:

$$QU_6 = K_{61}(IN_{21} - K_{63}) - K_{62}(IN_{21} - K_{63})^2,$$
where
$QU_6$ = specific enthalpy of major comonomer feed = signal 844,
$IN_{21}$ = major comonomer feed temperature = signal 102, and
$K_{61}$, $K_{62}$, and $K_{63}$ = constants.

In response to the reactor major comonomer specific enthalpy signal 842, the feed major comonomer specific enthalpy signal 844, and the major comonomer mass flow rate signal 609, a major comonomer heat removal determination means 845 generates a major comonomer heat removal signal 846 representative of the amount of heat removed from the reactor 10 by the major comonomer. Although any major comonomer heat removal determination means 845 which will generate the desired major comonomer heat removal signal 846 can be utilized, a preferred means is one which fulfills the general condition:

$$QU_{10} = K_{64}(FU_2)(QU_5-QU_6),$$
where
$QU_{10}$ = rate of heat removal from the reactor by the major comonomer = signal 846,
$FU_2$ = major comonomer mass flow rate = signal 609,
$QU_5$ = reactor major comonomer specific enthalpy = signal 842,
$QU_6$ = feed major comonomer specific enthalpy = signal 844, and
$K_{64}$ = a constant.

A production rate determination means 847 utilizes the known heat of reaction for the polymerization process taking place within the reactor 10 to produce an uncorrected polymer production rate signal 848 in response to the corrected coolant heat removal signal 816, the mixing heat signal 819, the ambient heat loss signal 822, then diluent heat removal signal 838, and the major comonomer heat removal heat signal 846. Although any production rate determination means 847 which will produce the desired production rate signal 848 can be utilized, a preferred means is one which fulfills the general condition:

$$FU_1 = K_{65}(QU_1+QU_4-QU_7+QU_8+QU_{10}),$$
where
$FU_1$ = uncorrected polymer production rate = signal 848,
$QU_1$ = corrected coolant heat removal rate = signal 816,
$QU_4$ = diluent heat removal rate = signal 838,
$QU_7$ = mixing heat addition rate = signal 819,
$QU_8$ = ambient heat loss rate = signal 822,
$QU_{10}$ = major comonomer heat removal rate = signal 846, an
$K_{65}$ = a constant.

A subtraction means 849 subtracts the minor comonomer conversion rate signal 202 from the uncorrected polymer production rate signal 848 to produce an uncorrected major comonomer production rate signal 850.

A major comonomer material balance update determination means 852 generates a major comonomer material balance update signal 853 in response to the major comonomer mass flow rate signal 609, the effluent major comonomer flow rate signal 722, and the production rate of polymer from major comonomer signal 707. Although any update means 852 which will produce the desired update signal 853 can be used, a preferred means is one which fulfills the general condition:

$$FU_{22} = FU_2 - FU_7 - FU_{10},$$
where
$FU_{22}$ = major comonomer material balance update = signal 853,
$FU_2$ = major comonomer mass flow rate = signal 609,
$FU_7$ = conversion rate of major comonomer to polymer = signal 707,
$FU_{10}$ = effluent major comonomer mass flow rate = signal 722.

A multiplying means 854 multiplies the major comonomer material balance update signal 853 by a proportional factor signal 855 to produce a proportional major comonomer material balance update signal 856. In response to the proportional major comonomer material balance update signal 856, a filtering means 857 produces a filtered proportional major comonomer material balance update signal 858. An integrating means 859 produces an integral major comonomer material balance update signal 860 in response to the major comonomer material balance update signal 853. A corrected major comonomer conversion rate determination means 861 generates the production rate of polymer from major comonomer signal 707 in response to the uncorrected major comonomer production rate signal 850, the filtered proportional major comonomer material balance update signal 858, and the integral major comonomer material balance update signal 860. Although any corrected conversion rate determination means 861 capable of producing the desired major comonomer conversion rate signal 707 can be utilized, a preferred means is one which fulfills the general condition:

$$FU_7 = FU_{27} + FF_2 + FU_{25},$$
where
$FU_7$ = major comonomer rate of conversion to polymer = signal 707,
$FU_{27}$ = uncorrected major comonomer conversion rate = signal 850,
$FF_2$ = filtered proportional major comonomer material balance update = signal 858, and
$FU_{25}$ = integral major comonomer material balance update = signal 860.

An adding means 863 adds the corrected major comonomer conversion rate signal 707 a the minor comonomer conversion rate signal 202 to produce a polymer production rate signal 864. In response to the polymer production rate signal 864 a filtering means 865 produces the filtered production rate signal 216.

From the above description it can be seen that in the described generation of a polymer production rate signal from a reactor energy balance, the production rate is equal to the heat removed from the reactor minus the heat added to the reactor, all divided by the heat of reaction. Included in the energy balance are heat removed by diluent, heat removed by major comonomer, heat removed by coolant, heat lost to ambient, and heat added by the mixer. A feedback update term is used to compensate for errors in calibrations of signals used in the energy balance by forcing the production rate from major comonomer to be equal to the major comonomer consumed by the reaction. The generated production rate is used for controlling the production rate of the reactor and for generating additional control signals as illustrated in FIGS. 7 and 2. A signal representative of the conversion rate of major comonomer is also generated as illustrated in FIG. 8 by dividing the polymer production from major comonomer by the major comonomer mass flow to the reactor.

Although the signal generation techniques illustrated by FIGS. 2–8 can be implemented in any means known to the art, a preferred method of signal generation utilizes a programmed digital computer to accept the various process measurement input signals and to generate in response thereto the major comonomer and recycle diluent input flow set point signals. Although the same method and apparatus could also be implemented utilizing a programmable analog computing means, a fixed wired analog computing means, or a fixed wired digital computing means, use of a programmable digital computing means makes it possible to utilize computing equipment already available at many installations or to take advantage of the many compact and relatively inexpensive small digital computers which are commercially available. One example of such a system is the Optrol D II system manufactured by Applied Automation, Inc., Bartlesville, Okla. FIGS. 1–8 of the drawing, along with the description and algorithms set forth in conjunction with the description of the drawing, are sufficient to enable a person skilled in the art to implement the method and apparatus of the invention by building a suitable hardware electrical circuit, by wiring a programmable analog computer, or by writing a program for a programmable digital computer to fulfill the signal generation requirements necessary to produce the generated controller set point signals.

The various filter means disclosed in FIGS. 2, 4, 5, 7, and 8 can be any means suitable for removing unwanted or meaningless variations from the various signals upon which they operate. It has been found that a first order lag means having a time constant chosen to eliminate or reduce the unwanted signal fluctuations is both easy to implement and effective in removing noise or other unwanted fluctuations from a signal. In some cases a filter incorporating both a lag term and a proportional term may be desirable, depending upon the specific application and the characteristics of the process being controlled. The specific filter means which will be employed with any specific installation will, of course, depend upon many factors which are individually characteristic of the reactor, the measuring devices being utilized, the dynamics of the reaction process, and other similar conditions. Modification of each of the filter means to provide the optimum control for a given installation has been a successful method of tuning the control system to its optimum level of effectiveness when used in conjunction with a particular reactor and its associated equipment.

The various constants $K_1$–$K_{63}$ will likewise vary from installation to installation due to the individual characteristics of each specific reactor and will also vary as a result of differences in measurement systems used. Although the constants disclosed will ordinarily remain constant over a substantial period of time, it is within the scope of the invention to automatically modify one or more constants during the course of operation of the disclosed control system in response to the occurrence of certain preselected conditions such as a change in ambient conditions, a continuing error associated with the generation of a particular signal, or other similar circumstances. In the case of bias signals and those constants which represent a bias signal, alterations of the constant can be used to maintain or achieve the desired degree of control or to provide an appropriate dead band. Those constants which are representative of individual reactor or process characteristics can be determined in any manner known to the art. A preferred method is curved fitting or multiple regression analysis or other similar techniques based on collection of data under actual reaction conditions.

The proportional-integral-derivative controllers disclosed can be any such controllers known in the art or a digital simulation or implementation of any such controllers wherein an output signal is made up of a combination of a proportional term, an integral term, and a derivative term generated in response to the comparison of an input signal representative of an actual process condition and a set point signal representative of the desired process condition. Although not specifically illustrated in the drawing, the proportional-integral-derivative controllers illustrated in FIG. 2 incorporate the use of a feedback signal in the generation of their respective output signals.

The integrating means of FIGS. 4, 7, and 8 can be any means for producing an output signal which bears an integral relationship to the input of the integrator means. The disclosed integrator means can be equipped with initialization or update means or both to facilitate startup of the integrator and/or updating of the integrator output in response to measured or generated signals.

Implementation of the disclosed method and apparatus in conjunction with the polymerization of an ethylene major comonomer and a hexane minor comonomer in the presence of an isobutane diluent and a hydrogen modifier has resulted in an increase in production of from 10 to 15 percent in excess of the product which has previously been obtained utilizing conventional major comonomer and recycle diluent set point signals. In addition, utilization of the method and apparatus of the invention has resulted in a smoother operation of the reactor and has prevented reactor plugging.

While the method and apparatus of the invention are useful in the production of copolymers in which the amount of major comonomer incorporated into the copolymer is substantially in excess of the amount of minor copolymer incorporated therein, the invention is particularly useful in production of a copolymer wherein the minor comonomer is incorporated into said copolymer in an amount less than about 20 percent, more preferably less than about 10 percent, by weight of the weight of major comonomer incorporated into said copolymer.

In the method and apparatus of the invention, control of the amount of recycle diluent entering the reactor is essentially equivalent to control of all diluent entering the reaction zone when the invention is practiced in accordance with the preferred embodiment disclosed and described, since the only loss of diluent from the system is that amount, about 1 percent for example, which is not flashed in the flash tank and is carried from the flash tank with the polymer product. The fresh diluent flow rate in the preferred embodiment described need only be sufficient to replace this small loss and to carry the catalyst to the reactor. The method and apparatus of the invention can be used, however, in any application wherein the diluent flow to the reactor can be controlled in response to a diluent set point signal by controlling either the recycle diluent flow, the fresh diluent flow, or both.

Although the invention has been disclosed and described in conjunction with a process which is particularly useful in the production of polyethylene from an ethylene monomer or from an ethylene major comonomer with a hexene minor comonomer wherein isobutane is utilized as the diluent and hydrogen as a modifier, the method and apparatus of the invention are not limited to such use. For example, other olefin polymerizations including the production of a homopolymer of ethylene, or a copolymer of ethylene with one or more minor comonomers such as propylene, hexene, and octene, or mixtures thereof, could be accomplished in accordance with the invention. Likewise the use of various paraffin and cycloparaffin diluents such as cyclohexane, hexane, isobutane, butane, or mixtures thereof is well within the scope of the invention. Other reasonable variations and modifications of the invention by those skilled in the art are also considered to be within the scope of the foregoing description and the appended claims.

What is claimed is:

1. A method for controlling a polymerization reaction, said method comprising the steps of:
   generating a monomer concentration signal representative of the concentration of an unpolymerized monomer within a reaction zone;
   controlling the flow rate of said monomer to said reacton zone in response to a preselected production rate set point signal representative of a desired rate of production of polymer within said reaction zone to provide monomer feed sufficient to maintain a preselected production rate; and
   automatically ceasing said step of controlling the flow rate of said monomer to said reaction zone in response to said production rate set point signal and initiating the step of controlling the flow rate of said monomer to said reaction zone in response to said monomer concentration signal to maintain monomer concentration within said reaction zone below a predetermined level, when said monomer concentration signal exceeds a predetermined value.

2. A method in accordance with claim 1 wherein said monomer comprises ethylene.

3. A method in accordance with claim 1 wherein said reaction comprises the polymerization of a major comonomer with at least one minor comonomer to produce a copolymer, said major comonomer being incorporated into said copolymer in an amount substantially in excess of the amount of said minor comonomer incorporated therein, and wherein said monomer is said major comonomer.

4. A method in accordance with claim 3 wherein said at least one minor comonomer is incorporated into said copolymer in an amount less than about 10 percent by weight of the weight of major comonomer incorporated into said copolymer.

5. A method in accordance with claim 4 wherein said major comonomer is ethylene.

6. A method in accordance with claim 5 wherein there is one minor comonomer and said one minor comonomer is hexene-1.

7. A method in accordance with claim 1 additionally comprising:
   generating a production rate signal representative of the production rate of polymer within said reaction zone; and
   resuming the step of controlling the flow rate of said monomer to said reaction zone in response to said production rate set point signal when said monomer concentration signal goes below a predetermined value and said production rate signal is within a predetermined range.

8. A method in accordance with claim 7 wherein said reaction comprises the polymerization of a major comonomer with at least one minor comonomer to produce a copolymer, said major comonomer being incorporated into said copolymer in an amount substantially in excess of the amount of said minor comonomer incorporated therein, and wherein said monomer is said major comonomer.

9. A method in accordance with claim 8 wherein said at least one minor comonomer is incorporated into said copolymer in an amount less than about 10 percent by weight of the weight of major comonomer incorporated into said copolymer.

10. A method in accordance with claim 9 wherein said major comonomer is ethylene.

11. A method in accordance with claim 10 wherein there is one minor comonomer and said one minor comonomer is hexene-1.

12. A method in accordance with claim 1 wherein said polymerization reaction takes place in the presence of a diluent, said method additionally comprising the steps of:
   generating a solids concentration signal representative of the concentration of polymerized material within said reaction zone;
   controlling the flow rate of diluent to said reaction zone in response to said monomer concentration set point signal to provide diluent feed sufficient to maintain a predetermined monomer concentration within said reaction zone; and
   automatically ceasing said step of controlling the flow rate of diluent to said reaction zone in response to said monomer concentration signal and initiating the step of controlling the flow rate of said diluent to said reaction zone in response to said solids concentration signal to maintain solids concentration within said reaction zone below a predetermined level when said solids concentration signal exceeds a preselected value.

13. A method in accordance with claim 12 wherein said reaction comprises the polymerization of a major comonomer with at least one minor comonomer to produce a copolymer, said major comonomer being incorporated into said copolymer in an amount substantially in excess of the amount of said minor comonomer incorporated therein, and wherein said monomer is said major comonomer.

14. A method in accordance with claim 13 wherein said at least one minor comonomer is incorporated into said copolymer in an amount less than about 10 percent by weight of the weight of major comonomer incorporated into said copolymer.

15. A method in accordance with claim 14 wherein said major comonomer is ethylene.

16. A method in accordance with claim 15 wherein there is one minor comonomer and said one minor comonomer is hexene-1.

17. A method in accordance with claim 16 wherein said diluent is selected from the group consisting of normal butane and isobutane.

18. A method in accordance with claim 12 additionally comprising the steps of:
   generating a production rate signal representative of the production rate of polymer within said reaction zone;
   resuming the step of controlling the flow rate of said monomer to said reaction zone in response to said production rate set point signal when said monomer concentration signal goes below a predetermined value and said production rate signal is within a predetermined range; and
   resuming the step of controlling the flow rate of said diluent to said reaction zone in response to said monomer concentration signal when said solids concentration signal goes below a predetermined value and said monomer concentration signal is within a preselected range.

19. A method in accordance with claim 18 wherein said reaction comprises the polymerization of a major comonomer with at least one minor comonomer to produce a copolymer, said major comonomer being incorporated into said copolymer in an amount substantially in excess of the amount of said minor comonomer incorporated therein, and wherein said monomer is said major comonomer.

20. A method in accordance with claim 19 wherein said at least one minor comonomer is incorporated into said copolymer in an amount less than about 10 percent by weight of the weight of major comonomer incorporated into said copolymer.

21. A method in accordance with claim 20 wherein said major comonomer is ethylene.

22. A method in accordance with claim 21 wherein there is one minor comonomer said one minor comonomer is hexene-1.

23. A method in accordance with claim 22 wherein said diluent is selected from the group consisting of normal butane and isobutane.

24. A method for controlling a polymerization reaction, said method comprising the steps of:
   generating a monomer concentration signal representative of the concentration of an unpolymerized monomer within a reaction zone;
   generating a solids concentration signal representative of the concentration of polymerized material within said reaction zone;
   controlling the flow rate of diluent to said reacton zone in response to said monomer concentration signal to provide diluent feed sufficient to maintain a predetermined monomer concentration within said reaction zone; and
   automatically ceasing said step of controlling the flow rate of said diluent in response to said monomer concentration signal and initiating the step of controlling the flow rate of said diluent to said reaction zone in response to said solids concentration signal to maintain solids concentration within said reaction zone below a predetermined level when said solids concentration signal exceeds a preselected value.

25. A method in accordance with claim 24 wherein said reaction comprises the polymerization of a major comonomer with at least one minor comonomer to produce a copolymer, said major comonomer being incorporated into said copolymer in an amount substantially in excess of the amount of said minor comonomer incorporated therein, and wherein said monomer is said major comonomer.

26. A method in accordance with claim 25 wherein said at least one minor comonomer is incorporated into said copolymer in an amount less than about 10 percent by weight of the weight of major comonomer incorporated into said copolymer.

27. A method in accordance with claim 26 wherein said major comonomer is ethylene.

28. A method in accordance with claim 27 wherein there is one minor comonomer and said one minor comonomer is hexene-1.

29. A method in accordance with claim 28 wherein said diluent is selected from the group consisting of normal butane and isobutane.

30. Apparatus comprising:
   polymerization reactor means;
   means for removing a polymeric product from said reactor means;
   monomer feed conduit means communicating with said reactor means for carrying a monomer to be polymerized into said reactor means;
   means for controlling the flow rate of monomer through said monomer feed conduit means to said reactor means in response to a monomer flow rate set point signal;
   means for providing a production rate set point signal representative of a desired polymeric product production rate within said reactor means;
   first signal generating means for generating a production rate signal representative of the rate at which polymer is being produced within said reactor means;
   second signal generating means for generating a monomer concentration signal representative of the concentration of said monomer within said reactor means;
   monomer set point generating means for generating said monomer flow rate set point signal, having a value corresponding to the monomer feed flow required to provide the desired production rate, in response to said production rate set point signal, for ceasing the generation of said monomer flow rate set point signal from said production rate set point signal and initiating the generation of said monomer flow rate set point signal, having a value corresponding to the monomer feed rate required to maintain monomer concentration within said reaction zone below a predetermined level, in response to said monomer concentration signal when said monomer concentration signal exceeds a predetermined value, and for reinstating the generation of said monomer flow rate set point signal from said production rate set point signal when said monomer concentration signal goes below a predetermined value and said production rate signal is within a predetermined range.

31. Apparatus in accordance with claim 30 wherein said monomer set point generating means comprises:
   means for generating a first switching signal when said production rate signal is within a predetermined range;
   means for generating a second switching signal when said monomer concentration signal exceeds a predetermined value; and
   first switching means for accepting said first and second switching signals, for causing said monomer flow rate set point signal to be generated in response to said production rate set point signal when said first switching signal is present and said second switching signal is absent, for causing said monomer flow rate set point signal to be generated in response to said monomer concentration signal when said second signal is present, and for causing the manner of generating said monomer flow rate set point signal to remain unchanged when both said first switching signal and said second switching signal are absent.

32. Apparatus in accordance with claim 30 additionally comprising:
   diluent feed conduit means communicating with said reactor means for carrying a diluent into said reactor means;
   means for controlling the flow rate of diluent through said diluent feed conduit to said reactor means in response to a diluent flow rate set point signal;
   third signal generating means for generating a solids concentration signal representative of the concentration of polymerized material within said reactor means; and diluent set point generating means for generating said diluent flow rate set point signal, having a value corresponding to the diluent flow rate required to provide the desired monomer concentration within said reaction zone, in response to said monomer concentration signal, for ceasing the generation of said diluent flow rate set point signal from said monomer concentration signal and initiating the generation of said diluent flow rate set point signal, having a valve corresponding to the diluent flow rate required to maintain solids concentration within said reaction zone below a predetermined level, in response to said solids concentration signal when said solids concentration signal exceeds a preselected maximum value, and for reinitiating generation of said diluent flow rate set point signal from said monomer concentration signal when said solids concentration signal goes below said preselected maximum value and said monomer concentration signal is within a preselected range.

33. Apparatus in accordance with claim 32 wherein said monomer set point generating means comprises:
means for generating a first switching signal when said production rate signal is within a predetermined range;
means for generating a second switching signal when said monomer concentration signal exceeds a predetermined value; and
first switching means for accepting said first and second switching signals, for causing said monomer flow rate set point signal to be generated in response to said production rate set point signal when said first switching signal is present and said second switching signal is absent, for causing said monomer flow rate set point signal to be generated in response to said monomer concentration signal when said second signal is present, and for causing the manner of generating said monomer flow rate set point signal to remain unchanged when both said first switching signal and second switching signal are absent; and
wherein said diluent set point generating means comprises:
means for generating a third switching signal when said monomer concentration signal is within a preselected range;
means for generating a fourth switching signal when said solids concentration signal exceeds said preselected maximum value; and
second swtiching means for accepting said third and fourth switching signals, for causing said diluent flow rate set point signal to be generated in response to said monomer concentration signal when said third switching signal is present and said fourth switching signal is absent, for causing said diluent flow rate set point signal to be generated in response to said solids concentration signal when said fourth signal is present, and for causing the manner of generating said diluent flow rate set point signal to remain unchanged when both said third switching signal and said fourth switching signal are absent.

34. Apparatus comprising:
polymerization reactor means;
means for removing a polymeric product from said reactor means;
monomer feed conduit means communicating with said reactor means for carrying a monomer to be polymerized into said reactor means;
diluent feed conduit means communicating with said reactor means for carrying a diluent into said reactor means;
means for controlling the flow rate of diluent through said diluent feed conduit to said reactor means in response to a diluent flow rate set point signal;
first signal generating means for generating a monomer concentration signal representative of the concentration of said monomer within said reactor means;
second signal generating means for generating a solids concentration signal representative of the concentration of polymerized material within said reactor means; and
diluent set point generating means for generating said diluent flow rate set point signal, having a value corresponding to the diluent flow rate required to provide the desired monomer concentration within said reaction zone, in response to said monomer concentration signal, for ceasing generation of said diluent flow rate set point signal from said monomer concentration signal and initiating generation of said diluent flow rate set point signal, having a value corresponding to the diluent flow rate required to maintain solids concentration within said reaction zone below a predetermined level, in response to said solids concentration signal when said solids concentration signal exceeds a preselected maximum value, and for reinitiating generation of said diluent flow rate set point signal from said monomer concentration signal when said solids concentration signal goes below said preselected maximum value and said production rate signal is within a preselected range.

35. Apparatus in accordance with claim 34 wherein said diluent set point generating means comprises:
means for generating a first switching signal when said monomer concentration signal is within a preselected range;
means for generating a second switching signal when said solids concentration signal exceeds a preselected value; and
switching means for accepting said first and second switching signals, for causing said diluent flow rate set point signal to be generated in response to said monomer concentration signal when said first switching signal is present and said second switching signal is absent, for causing said diluent flow rate set point signal to be generated in response to said solids concentration signal when said second signal is present, and for causing the manner of generating said diluent flow rate set point signal to remain unchanged when both said first switching signal and said second switching signal are absent.

36. A method for controlling a polymerization reaction, said method comprising the steps of:
generating a monomer concentration signal representative of the concentration of an unpolymerized monomer with said reaction zone;
controlling the flow rate of said monomer to said reaction zone in response to a preselected production rate set point signal representative of a desired rate of production of polymer within said reaction zone to provide monomer feed sufficient to maintain a preselected production rate within said reaction zone; and automatically ceasing said step of controlling the flow rate of said monomer to said reaction zone in response to said production rate set point signal and initiating the step of controlling the flow rate of said monomer to said reaction zone in response to comparison of a preselected high monomer concentration set point signal with said monomer concentration signal to maintain monomer concentration within said reaction zone below a predetermined level, when said monomer concentration signal exceeds a predetermined value.

37. A method in accordance with claim 36 wherein controlling the flow rate of said monomer to said reaction zone in response to said preselected production rate set point signal comprises:

generating a first flow rate set point signal representative of the flow rate of monomer to the reaction zone required to maintain the production rate represented by said production rate set point signal; and providing said first flow rate set point signal as a set point to a flow controller means for controlling the flow of said monomer to said reaction zone; and controlling the flow rate of said monomer to said reaction zone in response to comparison of said preselected high monomer concentration set point signal with said monomer concentration signal comprises:

providing said monomer concentration signal as an input signal to a proportional-integral-derivative controller means;

providing said preselected high monomer concentration set point signal as a set point to said proportional-integral-derivative controller means;

converting the output of said proportional-integral-derivative controller means to a second flow rate set point signal; and providing said second flow rate set point signal as a set point to said flow controller means for controlling the flow of said monomer to said reaction zone.

38. A method in accordance with claim 37 additionally comprising generating a production rate signal representative of the production rate of polymer within said reaction zone; and resuming the step of controlling the flow rate of said monomer to said reaction zone in response to said production rate set point signal when said monomer concentration signal goes below a predetermined value and said production rate signal is within a predetermined range.

39. A method in accordance with claim 36 additionally comprising generating a production rate signal representative of the production rate of polymer within said reaction zone; and resuming the step of controlling the flow rate of said monomer to said reaction zone in response to said production rate set point signal when said monomer concentration signal goes below a predetermined value and said production rate signal is within a predetermined range.

40. A method in accordance with claim 36 wherein said polymerization reaction takes place in the presence of a diluent, said method additionally comprising the steps of:

generating a solids concentration signal representative of the concentration of polymerized material within said reaction zone;

controlling the flow rate of diluent to said reaction zone in response to comparison of a preselected monomer concentration set point signal with said monomer concentration signal to provide diluent feed sufficient to maintain a predetermined monomer concentration within said reaction zone; and automatically ceasing said step of controlling the flow rate of diluent to said reaction zone in response to comparison of said monomer concentration set point signal with said monomer concentration signal and initiating the step of controlling the flow rate of said diluent to said reaction zone in response to comparison of a preselected high solids concentration set point signal with said solids concentration signal to maintain solids concentration within said reaction zone below a predetermined level when said solids concentration signal exceeds a preselected value.

41. A method in accordance with claim 40 wherein controlling the flow rate of said monomer to said reaction zone in response to said preselected production rate set point signal comprises:

generating a first flow rate set point signal representative of the flow rate of monomer to the reaction zone required to maintain the production rate represented by said production rate set point signal; and providing said first flow rate set point signal as a set point to a first flow controller means for controlling the flow of said monomer to said reaction zone;

controlling the flow rate of said monomer to said reaction zone in response to comparison of said preselected high monomer concentration set point signal with said monomer concentration signal comprises:

providing said monomer concentration signal as an input signal to a first proportional-integral-derivative controller means;

providing said preselected high monomer concentration set point signal as a set point to said first proportional-integral-derivative controller means;

converting the output of said first proportional-integral-derivative controller means to a second flow rate set point signal; and providing said second flow rate set point signal as a set point to said first flow controller means for controlling the flow of said monomer to said reaction zone;

controlling the flow rate of diluent to said reaction zone in response to comparison of said preselected monomer concentration set point signal with said monomer concentration signal comprises:

providing said monomer concentration signal as an input signal to a second proportional-integral-derivative controller means;

providing said preselected monomer concentration set point signal as a set point to said second proportional-integral-derivative controller means;

converting the output of said second proportional-integral-derivative means to a third flow rate set point signal; and providing said third flow rate set point signal as a set point to a second flow controller means for controlling the flow of said diluent to said reaction zone; and controlling the flow rate of diluent to said reaction zone in response to comparison of a preselected high solids concentration set point signal with said solids concentration signal comprises:

providing said solids concentration signal as an input signal to a third proportional-integral-derivative controller means;

providing said preselected high solids concentration set point signal as a set point to said third proportional-integral-derivative controller means;

converting the output of said third proportional-integral-derivative means to a fourth flow rate set point signal; and providing said fourth flow rate set point signal as a set point to said second flow controller means for controlling the flow of said diluent to said reaction zone.

42. A method in accordance with claim 41 additionally comprising steps of:

generating a production rate signal representative of the production rate of polymer within said reaction zone;

resuming the step of controlling the flow rate of said monomer to said reaction zone in response to said production rate set point signal when said monomer concentration signal goes below a predetermined value and said production rate signal is within a predetermined range; and resuming the step of controlling the flow rate of said diluent to said reaction zone in response to comparison of said preselected monomer concentration set point signal with said monomer concentration signal when said solids concentration signal goes below a predetermined value and said monomer concentration signal is within a preselected range.

43. A method in accordance with claim 40 additionally comprising the steps of:

generating a production rate signal representative of the production rate of polymer within said reaction zone;

resuming the step of controlling the flow rate of said monomer to said reaction zone in response to said production rate set point signal when said monomer concentration signal goes below a predetermined value and said production rate signal is within a predetermined range; and resuming the step of controlling the flow rate of said diluent to said reaction zone in response to comparison of said preselected monomer concentration set point signal with said monomer concentration signal when said solids concentration signal goes below a predetermined value and said monomer concentration signal is within a preselected range.

44. A method for controlling a polymerization reaction, said method comprising the steps of:

generating a monomer concentration signal representative of the concentration of an unpolymerized monomer within said reaction zone;

generating a solids concentration signal representative of the concentration of polymerized material within said reaction zone;

controlling the flow rate of diluent to said reaction zone in response to comparison of a preselected monomer concentration set point signal with said monomer concentration signal to provide diluent feed sufficient to maintain a predetermined monomer concentration within said reaction zone; and automatically ceasing step of controlling the flow rate of said diluent in response to comparison of said monomer concentration set point signal with said monomer concentration signal and initiating the step of controlling the flow rate of said diluent to said reaction zone in response to comparison of a preselected high solids concentration set point signal with said solids concentration signal to maintain solids concentration within said reaction zone below a predetermined level when said solids concentration signal exceeds a preselected value.

45. A method in accordance with claim 44 wherein controlling the flow rate of diluent to said reaction zone in response to comparison of said preselected monomer concentration set point signal with said monomer concentration signal comprises:

providing said monomer concentration signal as an input signal to a first proportional-integral-derivative controller means;

providing said preselected monomer concentration set point signal as a set point to said first proportional-integral-derivative controller means;

converting the output of said first proportional-integral-derivative means to a first flow rate set point signal; and providing said first flow rate set point signal as a set point to a flow controller means for controlling the flow of said diluent to said reaction zone; and controlling the flow rate of diluent to said reaction zone in response to comparison of a preselected high solids concentration set point signal with said solids concentration signal comprises:

providing said solids concentration signal as an input signal to a second proportional-integral-derivative controller means;

providing said preselected high solids concentration set point signal as a set point to said second proportional-integral-derivative controller means;

converting the output of said second proportional-integral-derivative means to a second flow rate set point signal; and providing said second flow rate set point signal as a set point to said flow controller means for controlling the flow of said diluent to said reaction zone.

46. A method in accordance with claim 45 additionally comprising resuming the step of controlling the flow rate of said diluent to said reaction zone in response to comparison of said preselected monomer concentration set point signal with said monomer concentration signal when said solids concentration signal goes below a predetermined value and said monomer concentration signal is within a preselected range.

47. A method in accordance with claim 44 additionally comprising resuming the step of controlling the flow rate of said diluent to said reaction zone in response to comparison of said preselected monomer concentration set point signal with said monomer concentration signal when said solids concentration signal goes below a predetermined value and said monomer concentration signal is within a preselected range.

48. A method in accordance with claim 24 additionally comprising resuming the step of controlling the flow rate of said diluent to said reaction zone in response to said monomer concentration signal when said solids concentration signal goes below a predetermined value and said monomer concentration signal is within a preselected range.

* * * * *